United States Patent
Kleinbeck

(10) Patent No.: US 10,943,493 B2
(45) Date of Patent: *Mar. 9, 2021

(54) UNMANNED VEHICLE RECOGNITION AND THREAT MANAGEMENT

(71) Applicant: Digital Global Systems, Inc., Tysons Corner, VA (US)

(72) Inventor: David William Kleinbeck, Lees Summit, MO (US)

(73) Assignee: DIGITAL GLOBAL SYSTEMS, INC., Tysons Corner, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,811

(22) Filed: Jan. 2, 2020

(65) Prior Publication Data

US 2020/0184832 A1  Jun. 11, 2020

Related U.S. Application Data

(63) Continuation of application No. 16/275,575, filed on Feb. 14, 2019, now Pat. No. 10,529,241, which is a
(Continued)

(51) Int. Cl.
*G08G 5/00* (2006.01)
*G06N 3/08* (2006.01)
(Continued)

(52) U.S. Cl.
CPC ............ *G08G 5/0026* (2013.01); *G01S 3/043* (2013.01); *G01S 3/046* (2013.01); *G01S 3/46* (2013.01);
(Continued)

(58) Field of Classification Search
CPC .... G08G 5/0026; G08G 5/0069; G01S 3/043; G01S 3/046; G01S 3/46; G06N 3/08; G06N 7/005
See application file for complete search history.

(56) References Cited

U.S. PATENT DOCUMENTS

| 4,215,345 A | 7/1980 | Robert et al. |
| 4,501,020 A | 2/1985 | Wakeman |

(Continued)

FOREIGN PATENT DOCUMENTS

KR 20140041618 A 4/2014

OTHER PUBLICATIONS

David Eppink and Wolf Kuebler, "TIREM/SEM Handbook", Mar. 1994, IIT Research Institute, p. 1-6, located at http://www.dtic.mil/cgi-bin/GetTRDoc?Location=U2&doc=GetTRDoc.pdf&AD=ADA296913.
(Continued)

*Primary Examiner* — Nguyen T Vo
(74) *Attorney, Agent, or Firm* — Neo IP

(57) ABSTRACT

Systems and methods for automated unmanned aerial vehicle recognition. A multiplicity of receivers captures RF data and transmits the RF data to at least one node device. The at least one node device comprises a signal processing engine, a detection engine, a classification engine, and a direction finding engine. The at least one node device is configured with an artificial intelligence algorithm. The detection engine and classification engine are trained to detect and classify signals from unmanned vehicles and their controllers based on processed data from the signal processing engine. The direction finding engine is operable to provide lines of bearing for detected unmanned vehicles.

20 Claims, 21 Drawing Sheets

Related U.S. Application Data continuation-in-part of application No. 16/274,933, filed on Feb. 13, 2019, now Pat. No. 10,498,951, which is a continuation-in-part of application No. 16/180,690, filed on Nov. 5, 2018, now Pat. No. 10,459,020, which is a continuation-in-part of application No. 15/412,982, filed on Jan. 23, 2017, now Pat. No. 10,122,479.

(60) Provisional application No. 62/722,420, filed on Aug. 24, 2018, provisional application No. 62/632,276, filed on Feb. 19, 2018.

(51) Int. Cl.
*G01S 3/04* (2006.01)
*G06N 7/00* (2006.01)
*G01S 3/46* (2006.01)

(52) U.S. Cl.
CPC .............. *G06N 3/08* (2013.01); *G06N 7/005* (2013.01); *G08G 5/0069* (2013.01)

(56) References Cited

U.S. PATENT DOCUMENTS

| | | | |
|---|---|---|---|
| 4,638,493 A | 1/1987 | Bishop et al. |
| 4,928,106 A | 5/1990 | Ashjaee et al. |
| 5,134,407 A | 7/1992 | Lorenz et al. |
| 5,230,087 A | 7/1993 | Meyer et al. |
| 5,293,170 A | 3/1994 | Lorenz et al. |
| 5,343,212 A | 8/1994 | Rose et al. |
| 5,393,713 A | 2/1995 | Schwob |
| 5,506,864 A | 4/1996 | Schilling |
| 5,513,385 A | 4/1996 | Tanaka |
| 5,548,809 A | 8/1996 | Lemson |
| 5,570,099 A | 10/1996 | DesJardins |
| 5,589,835 A | 12/1996 | Gildea et al. |
| 5,612,703 A | 3/1997 | Mallinckrodt |
| 5,831,874 A | 11/1998 | Boone et al. |
| 5,835,857 A | 11/1998 | Otten |
| 5,856,803 A | 1/1999 | Pevler |
| 5,936,575 A | 8/1999 | Azzarelli et al. |
| 6,018,312 A | 1/2000 | Haworth |
| 6,085,090 A | 7/2000 | Yee et al. |
| 6,115,580 A | 9/2000 | Chuprun et al. |
| 6,134,445 A | 10/2000 | Gould et al. |
| 6,144,336 A | 11/2000 | Preston et al. |
| 6,157,619 A | 12/2000 | Ozluturk et al. |
| 6,191,731 B1 | 2/2001 | McBurney et al. |
| 6,249,252 B1 | 6/2001 | Dupray |
| 6,286,021 B1 | 9/2001 | Tran et al. |
| 6,296,612 B1 | 10/2001 | Mo et al. |
| 6,304,760 B1 | 10/2001 | Thomson et al. |
| 6,339,396 B1 | 1/2002 | Mayersak |
| 6,418,131 B1 | 7/2002 | Snelling et al. |
| 6,492,945 B2 | 12/2002 | Counselman, III et al. |
| 6,512,788 B1 | 1/2003 | Kuhn et al. |
| 6,628,231 B2 | 9/2003 | Mayersak |
| 6,677,895 B1 | 1/2004 | Holt |
| 6,707,910 B1 | 3/2004 | Valve et al. |
| 6,711,404 B1 | 3/2004 | Arpee et al. |
| 6,741,595 B2 | 5/2004 | Maher et al. |
| 6,771,957 B2 | 8/2004 | Chitrapu |
| 6,785,321 B1 | 8/2004 | Yang et al. |
| 6,850,557 B1 | 2/2005 | Gronemeyer |
| 6,850,735 B2 | 2/2005 | Sugar et al. |
| 6,859,831 B1 | 2/2005 | Gelvin et al. |
| 6,861,982 B2 | 3/2005 | Forstrom et al. |
| 6,876,326 B2 | 4/2005 | Martorana |
| 6,898,197 B1 | 5/2005 | Lavean |
| 6,898,235 B1 | 5/2005 | Carlin et al. |
| 6,904,269 B1 | 6/2005 | Deshpande et al. |
| 6,985,437 B1 | 1/2006 | Vogel |
| 7,035,593 B2 | 4/2006 | Miller et al. |
| 7,043,207 B2 | 5/2006 | Miyazaki |
| 7,049,965 B2 | 5/2006 | Kelliher et al. |
| 7,110,756 B2 | 9/2006 | Diener |
| 7,116,943 B2 | 10/2006 | Sugar et al. |
| 7,146,176 B2 | 12/2006 | Mchenry |
| 7,151,938 B2 | 12/2006 | Weigand |
| 7,152,025 B2 | 12/2006 | Lusky et al. |
| 7,162,207 B2 | 1/2007 | Kursula et al. |
| 7,171,161 B2 | 1/2007 | Miller |
| 7,187,326 B2 | 3/2007 | Beadle et al. |
| 7,206,350 B2 | 4/2007 | Korobkov et al. |
| 7,254,191 B2 | 8/2007 | Sugar et al. |
| 7,269,151 B2 | 9/2007 | Diener et al. |
| 7,292,656 B2 | 11/2007 | Kloper et al. |
| 7,298,327 B2 | 11/2007 | Dupray et al. |
| 7,366,463 B1 | 4/2008 | Archer et al. |
| 7,408,907 B2 | 8/2008 | Diener |
| 7,424,268 B2 | 9/2008 | Diener et al. |
| 7,459,898 B1 | 12/2008 | Woodings |
| 7,466,960 B2 | 12/2008 | Sugar |
| 7,471,683 B2 | 12/2008 | Maher, III et al. |
| 7,555,262 B2 | 6/2009 | Brenner |
| 7,564,816 B2 | 7/2009 | Mchenry et al. |
| 7,595,754 B2 | 9/2009 | Mehta |
| 7,606,335 B2 | 10/2009 | Kloper et al. |
| 7,606,597 B2 | 10/2009 | Weigand |
| 7,620,396 B2 | 11/2009 | Floam et al. |
| 7,676,192 B1 | 3/2010 | Wilson |
| 7,692,532 B2 | 4/2010 | Fischer et al. |
| 7,692,573 B1 | 4/2010 | Funk |
| 7,702,044 B2 | 4/2010 | Nallapureddy et al. |
| 7,725,110 B2 | 5/2010 | Weigand |
| 7,728,755 B1 | 6/2010 | Jocic |
| 7,801,490 B1 | 9/2010 | Scherzer |
| 7,835,319 B2 | 11/2010 | Sugar |
| 7,865,140 B2 | 1/2011 | Levien et al. |
| 7,893,875 B1 | 2/2011 | Smith |
| 7,933,344 B2 | 4/2011 | Hassan et al. |
| 7,945,215 B2 | 5/2011 | Tang |
| 7,953,549 B2 | 5/2011 | Graham et al. |
| 7,965,641 B2 | 6/2011 | Ben Letaief et al. |
| 8,001,901 B2 | 8/2011 | Bass |
| 8,006,195 B1 | 8/2011 | Woodings et al. |
| 8,023,957 B2 | 9/2011 | Weigand |
| 8,026,846 B2 | 9/2011 | Mcfadden et al. |
| 8,027,249 B2 | 9/2011 | Mchenry et al. |
| 8,027,690 B2 | 9/2011 | Shellhammer |
| 8,045,660 B1 | 10/2011 | Gupta |
| 8,055,204 B2 | 11/2011 | Livsics et al. |
| 8,059,694 B2 | 11/2011 | Junell et al. |
| 8,060,017 B2 | 11/2011 | Schlicht et al. |
| 8,060,035 B2 | 11/2011 | Haykin |
| 8,060,104 B2 | 11/2011 | Chaudhri et al. |
| 8,064,840 B2 | 11/2011 | McHenry et al. |
| 8,077,662 B2 | 12/2011 | Srinivasan et al. |
| RE43,066 E | 1/2012 | McHenry |
| 8,094,610 B2 | 1/2012 | Wang et al. |
| 8,107,391 B2 | 1/2012 | Wu et al. |
| 8,125,213 B2 | 2/2012 | Goguillon et al. |
| 8,131,239 B1 | 3/2012 | Walker et al. |
| 8,134,493 B2 | 3/2012 | Noble et al. |
| 8,151,311 B2 | 4/2012 | Huffman et al. |
| 8,155,039 B2 | 4/2012 | Wu et al. |
| 8,155,649 B2 | 4/2012 | McHenry et al. |
| 8,160,839 B1 | 4/2012 | Woodings et al. |
| 8,170,577 B2 | 5/2012 | Singh |
| 8,175,539 B2 | 5/2012 | Diener et al. |
| 8,184,653 B2 | 5/2012 | Dain et al. |
| 8,193,981 B1 | 6/2012 | Hwang et al. |
| 8,213,868 B2 | 7/2012 | Du et al. |
| 8,224,254 B2 | 7/2012 | Haykin |
| 8,233,928 B2 | 7/2012 | Stanforth et al. |
| 8,238,247 B2 | 8/2012 | Wu et al. |
| 8,249,028 B2 | 8/2012 | Porras et al. |
| 8,249,631 B2 | 8/2012 | Sawai |
| 8,260,207 B2 | 9/2012 | Srinivasan et al. |
| 8,265,684 B2 | 9/2012 | Sawai |
| 8,279,786 B1 | 10/2012 | Smith et al. |
| 8,280,433 B2 | 10/2012 | Quinn et al. |
| 8,289,907 B2 | 10/2012 | Seidel et al. |

(56) References Cited

U.S. PATENT DOCUMENTS

| | | | |
|---|---|---|---|
| 8,290,503 B2 | 10/2012 | Sadek et al. | |
| 8,295,877 B2 | 10/2012 | Hui et al. | |
| 8,305,215 B2 | 11/2012 | Markhovsky et al. | |
| 8,311,483 B2 | 11/2012 | Tillman et al. | |
| 8,311,509 B2 | 11/2012 | Feher | |
| 8,315,571 B2 | 11/2012 | Lindoff et al. | |
| 8,320,910 B2 | 11/2012 | Bobier | |
| 8,326,240 B1 | 12/2012 | Kadambe et al. | |
| 8,326,309 B2 | 12/2012 | Mody et al. | |
| 8,326,313 B2 | 12/2012 | McHenry et al. | |
| 8,335,204 B2 | 12/2012 | Samarasooriya et al. | |
| 8,346,273 B2 | 1/2013 | Weigand | |
| 8,350,970 B2 | 1/2013 | Birkett et al. | |
| 8,358,723 B1 | 1/2013 | Hamkins et al. | |
| 8,364,188 B2 | 1/2013 | Srinivasan et al. | |
| 8,369,305 B2 | 2/2013 | Diener et al. | |
| 8,373,759 B2 | 2/2013 | Samarasooriya et al. | |
| 8,391,794 B2 | 3/2013 | Sawai et al. | |
| 8,391,796 B2 | 3/2013 | Srinivasan et al. | |
| 8,401,564 B2 | 3/2013 | Singh | |
| 8,406,776 B2 | 3/2013 | Jallon | |
| 8,406,780 B2 | 3/2013 | Mueck | |
| RE44,142 E | 4/2013 | Wilson | |
| 8,421,676 B2 | 4/2013 | Moshfeghi | |
| 8,422,453 B2 | 4/2013 | Abedi | |
| 8,422,958 B2 | 4/2013 | Du et al. | |
| RE44,237 E | 5/2013 | Mchenry | |
| 8,437,700 B2 | 5/2013 | Mody et al. | |
| 8,442,445 B2 | 5/2013 | Mody et al. | |
| 8,451,751 B2 | 5/2013 | Challapali et al. | |
| 8,463,195 B2 | 6/2013 | Shellhammer | |
| 8,467,353 B2 | 6/2013 | Proctor | |
| 8,483,155 B1 | 7/2013 | Banerjea et al. | |
| 8,494,464 B1 | 7/2013 | Kadambe et al. | |
| 8,503,955 B2 | 8/2013 | Kang et al. | |
| 8,504,087 B2 | 8/2013 | Stanforth et al. | |
| 8,514,729 B2 | 8/2013 | Blackwell | |
| 8,515,473 B2 | 8/2013 | Mody et al. | |
| 8,520,606 B2 | 8/2013 | Cleveland | |
| RE44,492 E | 9/2013 | Mchenry | |
| 8,526,974 B2 | 9/2013 | Olsson et al. | |
| 8,532,686 B2 | 9/2013 | Schmidt et al. | |
| 8,538,339 B2 | 9/2013 | Hu et al. | |
| 8,548,521 B2 | 10/2013 | Hui et al. | |
| 8,554,264 B1 | 10/2013 | Gibbons et al. | |
| 8,559,301 B2 | 10/2013 | Mchenry et al. | |
| 8,565,811 B2 | 10/2013 | Tan et al. | |
| 8,599,024 B2 | 12/2013 | Bloy | |
| 8,718,838 B2 | 5/2014 | Kokkeby et al. | |
| 8,761,051 B2 | 6/2014 | Brisebois et al. | |
| 8,780,968 B1 | 7/2014 | Garcia et al. | |
| 8,798,548 B1 | 8/2014 | Carbajal | |
| 8,805,291 B1 | 8/2014 | Garcia et al. | |
| 8,818,283 B2 | 8/2014 | McHenry et al. | |
| 8,824,536 B1 | 9/2014 | Garcia et al. | |
| 8,843,155 B2 | 9/2014 | Burton et al. | |
| 8,977,212 B2 | 3/2015 | Carbajal | |
| 9,007,262 B1 | 4/2015 | Witzgall | |
| 9,078,162 B2 | 7/2015 | Garcia et al. | |
| 9,143,968 B1 | 9/2015 | Manku et al. | |
| 9,185,591 B2 | 11/2015 | Carbajal | |
| 9,288,683 B2 | 3/2016 | Garcia et al. | |
| 9,412,278 B1 | 8/2016 | Gong et al. | |
| 9,414,237 B2 | 8/2016 | Garcia et al. | |
| 9,537,586 B2 | 1/2017 | Carbajal | |
| 9,658,341 B2 | 5/2017 | Mathews et al. | |
| 9,674,684 B1 | 6/2017 | Mendelson | |
| 9,749,069 B2 | 8/2017 | Garcia et al. | |
| 9,998,243 B2 | 6/2018 | Garcia et al. | |
| 10,251,242 B1 | 4/2019 | Rosen et al. | |
| 10,408,936 B2 * | 9/2019 | Van Voorst | B64C 39/024 |
| 10,529,241 B2 * | 1/2020 | Kleinbeck | G06N 7/005 |
| 10,613,209 B2 * | 4/2020 | Emami | G08G 5/0078 |
| 2001/0020220 A1 | 9/2001 | Kurosawa | |
| 2002/0044082 A1 | 4/2002 | Woodington et al. | |
| 2002/0070889 A1 | 6/2002 | Griffin et al. | |
| 2002/0097184 A1 | 7/2002 | Mayersak | |
| 2002/0119754 A1 | 8/2002 | Wakutsu et al. | |
| 2002/0161775 A1 | 10/2002 | Lasensky et al. | |
| 2003/0013454 A1 | 1/2003 | Hunzinger | |
| 2003/0087648 A1 | 5/2003 | Mezhvinsky et al. | |
| 2003/0145328 A1 | 7/2003 | Rabinowitz et al. | |
| 2003/0198304 A1 | 10/2003 | Sugar et al. | |
| 2003/0232612 A1 | 12/2003 | Richards et al. | |
| 2004/0127214 A1 | 7/2004 | Reddy et al. | |
| 2004/0147254 A1 | 7/2004 | Reddy et al. | |
| 2004/0171390 A1 | 9/2004 | Chitrapu | |
| 2004/0203826 A1 | 10/2004 | Sugar et al. | |
| 2004/0208238 A1 | 10/2004 | Thomas et al. | |
| 2004/0219885 A1 | 11/2004 | Sugar et al. | |
| 2004/0233100 A1 | 11/2004 | Dibble et al. | |
| 2005/0003828 A1 | 1/2005 | Sugar et al. | |
| 2005/0096026 A1 | 5/2005 | Chitrapu et al. | |
| 2005/0107102 A1 | 5/2005 | Yoon et al. | |
| 2005/0176401 A1 | 8/2005 | Nanda et al. | |
| 2005/0227625 A1 | 10/2005 | Diener | |
| 2005/0285792 A1 | 12/2005 | Sugar et al. | |
| 2006/0025118 A1 | 2/2006 | Chitrapu et al. | |
| 2006/0128311 A1 | 6/2006 | Tesfai | |
| 2006/0238417 A1 | 10/2006 | Jendbro et al. | |
| 2006/0258347 A1 | 11/2006 | Chitrapu | |
| 2007/0076657 A1 | 4/2007 | Woodings et al. | |
| 2007/0098089 A1 | 5/2007 | Li et al. | |
| 2007/0223419 A1 | 9/2007 | Ji et al. | |
| 2007/0233409 A1 | 10/2007 | Boyan et al. | |
| 2007/0293171 A1 | 12/2007 | Li et al. | |
| 2007/0297541 A1 | 12/2007 | Mcgehee | |
| 2008/0001735 A1 | 1/2008 | Tran | |
| 2008/0010040 A1 | 1/2008 | Mcgehee | |
| 2008/0090563 A1 | 4/2008 | Chitrapu | |
| 2008/0130519 A1 | 6/2008 | Bahl et al. | |
| 2008/0180325 A1 | 7/2008 | Chung et al. | |
| 2008/0186235 A1 | 8/2008 | Struckman et al. | |
| 2008/0195584 A1 | 8/2008 | Nath et al. | |
| 2008/0209117 A1 | 8/2008 | Kajigaya | |
| 2008/0211481 A1 | 9/2008 | Chen | |
| 2008/0252516 A1 | 10/2008 | Ho et al. | |
| 2009/0011713 A1 | 1/2009 | Abusubaih et al. | |
| 2009/0046003 A1 | 2/2009 | Tung et al. | |
| 2009/0046625 A1 | 2/2009 | Diener et al. | |
| 2009/0066578 A1 | 3/2009 | Beadle et al. | |
| 2009/0111463 A1 | 4/2009 | Simms et al. | |
| 2009/0143019 A1 | 6/2009 | Shellhammer | |
| 2009/0149202 A1 | 6/2009 | Hill et al. | |
| 2009/0190511 A1 | 7/2009 | Li et al. | |
| 2009/0207950 A1 | 8/2009 | Tsuruta et al. | |
| 2009/0224957 A1 | 9/2009 | Chung et al. | |
| 2009/0278733 A1 | 11/2009 | Haworth | |
| 2009/0282130 A1 | 11/2009 | Antoniou et al. | |
| 2009/0286563 A1 | 11/2009 | Ji et al. | |
| 2010/0020707 A1 | 1/2010 | Woodings | |
| 2010/0056200 A1 | 3/2010 | Tolonen | |
| 2010/0075704 A1 | 3/2010 | Mchenry et al. | |
| 2010/0172443 A1 | 7/2010 | Shim et al. | |
| 2010/0173586 A1 | 7/2010 | Mchenry et al. | |
| 2010/0176988 A1 | 7/2010 | Maezawa et al. | |
| 2010/0220011 A1 | 9/2010 | Heuser | |
| 2010/0255794 A1 | 10/2010 | Agnew | |
| 2010/0255801 A1 | 10/2010 | Gunasekara et al. | |
| 2010/0259998 A1 | 10/2010 | Kwon et al. | |
| 2010/0309317 A1 | 12/2010 | Wu et al. | |
| 2011/0022342 A1 | 1/2011 | Pandharipande et al. | |
| 2011/0045781 A1 | 2/2011 | Shellhammer et al. | |
| 2011/0053604 A1 | 3/2011 | Kim et al. | |
| 2011/0059747 A1 | 3/2011 | Lindoff et al. | |
| 2011/0070885 A1 | 3/2011 | Ruuska et al. | |
| 2011/0074631 A1 | 3/2011 | Parker | |
| 2011/0077017 A1 | 3/2011 | Yu et al. | |
| 2011/0087639 A1 | 4/2011 | Gurney | |
| 2011/0090939 A1 | 4/2011 | Diener et al. | |
| 2011/0096770 A1 | 4/2011 | Henry | |
| 2011/0102258 A1 | 5/2011 | Underbrink et al. | |
| 2011/0111751 A1 | 5/2011 | Markhovsky et al. | |
| 2011/0116484 A1 | 5/2011 | Henry | |

(56) References Cited

U.S. PATENT DOCUMENTS

| | | |
|---|---|---|
| 2011/0117869 A1 | 5/2011 | Woodings |
| 2011/0122855 A1 | 5/2011 | Henry |
| 2011/0183685 A1 | 7/2011 | Burton et al. |
| 2011/0185059 A1 | 7/2011 | Adnani et al. |
| 2011/0237243 A1 | 9/2011 | Guvenc et al. |
| 2011/0273328 A1 | 11/2011 | Parker |
| 2011/0287779 A1 | 11/2011 | Harper |
| 2011/0299481 A1 | 12/2011 | Kim et al. |
| 2012/0014332 A1 | 1/2012 | Smith et al. |
| 2012/0032854 A1 | 2/2012 | Bull et al. |
| 2012/0039284 A1 | 2/2012 | Barbieri et al. |
| 2012/0052869 A1 | 3/2012 | Lindoff et al. |
| 2012/0058775 A1 | 3/2012 | Dupray et al. |
| 2012/0071188 A1 | 3/2012 | Wang et al. |
| 2012/0072986 A1 | 3/2012 | Livsics et al. |
| 2012/0077510 A1 | 3/2012 | Chen et al. |
| 2012/0081248 A1 | 4/2012 | Kennedy et al. |
| 2012/0094681 A1 | 4/2012 | Freda et al. |
| 2012/0100810 A1 | 4/2012 | Oksanen et al. |
| 2012/0115522 A1 | 5/2012 | Nama et al. |
| 2012/0115525 A1 | 5/2012 | Kang et al. |
| 2012/0120892 A1 | 5/2012 | Freda et al. |
| 2012/0129522 A1 | 5/2012 | Kim et al. |
| 2012/0140236 A1 | 6/2012 | Babbitt et al. |
| 2012/0142386 A1 | 6/2012 | Mody et al. |
| 2012/0148068 A1 | 6/2012 | Chandra et al. |
| 2012/0148069 A1 | 6/2012 | Bai et al. |
| 2012/0155217 A1 | 6/2012 | Dellinger et al. |
| 2012/0182430 A1 | 7/2012 | Birkett et al. |
| 2012/0195269 A1 | 8/2012 | Kang et al. |
| 2012/0212628 A1 | 8/2012 | Wu et al. |
| 2012/0214511 A1 | 8/2012 | Vartanian et al. |
| 2012/0230214 A1 | 9/2012 | Kozisek et al. |
| 2012/0246392 A1 | 9/2012 | Cheon |
| 2012/0264388 A1 | 10/2012 | Guo et al. |
| 2012/0264445 A1 | 10/2012 | Lee et al. |
| 2012/0275354 A1 | 11/2012 | Villain |
| 2012/0281000 A1 | 11/2012 | Woodings |
| 2012/0282942 A1 | 11/2012 | Uusitalo et al. |
| 2012/0295575 A1 | 11/2012 | Nam |
| 2012/0302190 A1 | 11/2012 | Mchenry |
| 2012/0302263 A1 | 11/2012 | Tinnakomsrisuphap et al. |
| 2012/0322487 A1 | 12/2012 | Stanforth |
| 2013/0005240 A1 | 1/2013 | Novak et al. |
| 2013/0005374 A1 | 1/2013 | Uusitalo et al. |
| 2013/0012134 A1 | 1/2013 | Jin et al. |
| 2013/0017794 A1 | 1/2013 | Kloper et al. |
| 2013/0023285 A1 | 1/2013 | Markhovsky et al. |
| 2013/0028111 A1 | 1/2013 | Dain et al. |
| 2013/0035108 A1 | 2/2013 | Joslyn et al. |
| 2013/0035128 A1 | 2/2013 | Chan et al. |
| 2013/0045754 A1 | 2/2013 | Markhovsky et al. |
| 2013/0052939 A1 | 2/2013 | Anniballi et al. |
| 2013/0053054 A1 | 2/2013 | Lovitt et al. |
| 2013/0064197 A1 | 3/2013 | Novak et al. |
| 2013/0064328 A1 | 3/2013 | Adnani et al. |
| 2013/0070639 A1 | 3/2013 | Demura et al. |
| 2013/0090071 A1 | 4/2013 | Abraham et al. |
| 2013/0095843 A1 | 4/2013 | Smith et al. |
| 2013/0100154 A1 | 4/2013 | Woodings et al. |
| 2013/0103684 A1 | 4/2013 | Yee et al. |
| 2013/0165051 A9 | 6/2013 | Li et al. |
| 2013/0165134 A1 | 6/2013 | Touag et al. |
| 2013/0165170 A1 | 6/2013 | Kang |
| 2013/0183989 A1 | 7/2013 | Hasegawa et al. |
| 2013/0183994 A1 | 7/2013 | Ringstroem et al. |
| 2013/0190003 A1 | 7/2013 | Smith et al. |
| 2013/0190028 A1 | 7/2013 | Wang et al. |
| 2013/0196677 A1 | 8/2013 | Smith et al. |
| 2013/0208587 A1 | 8/2013 | Bala et al. |
| 2013/0210457 A1 | 8/2013 | Kummetz |
| 2013/0210473 A1 | 8/2013 | Weigand |
| 2013/0217406 A1 | 8/2013 | Villardi et al. |
| 2013/0217408 A1 | 8/2013 | Difazio et al. |
| 2013/0217450 A1 | 8/2013 | Kanj et al. |
| 2013/0231121 A1 | 9/2013 | Kwak et al. |
| 2013/0237212 A1 | 9/2013 | Khayrallah et al. |
| 2013/0242792 A1 | 9/2013 | Woodings |
| 2013/0242934 A1 | 9/2013 | Ueda et al. |
| 2013/0260703 A1 | 10/2013 | Actis et al. |
| 2013/0265198 A1 | 10/2013 | Stroud |
| 2013/0288734 A1 | 10/2013 | Mody et al. |
| 2013/0329690 A1 | 12/2013 | Kim et al. |
| 2014/0064723 A1 | 3/2014 | Adles et al. |
| 2014/0073261 A1 | 3/2014 | Hassan et al. |
| 2014/0086212 A1 | 3/2014 | Kafle et al. |
| 2014/0163309 A1 | 6/2014 | Bernhard et al. |
| 2014/0201367 A1 | 7/2014 | Trummer et al. |
| 2014/0206307 A1 | 7/2014 | Maurer et al. |
| 2014/0269374 A1 | 9/2014 | Abdelmonem et al. |
| 2014/0269376 A1 | 9/2014 | Garcia et al. |
| 2014/0340684 A1 | 11/2014 | Edler et al. |
| 2014/0342675 A1 | 11/2014 | Massarella et al. |
| 2015/0072633 A1 | 3/2015 | Massarella et al. |
| 2015/0289254 A1 | 10/2015 | Garcia et al. |
| 2016/0117853 A1* | 4/2016 | Zhong .................. B64D 47/08 345/634 |
| 2016/0124071 A1 | 5/2016 | Baxley et al. |
| 2016/0345135 A1 | 11/2016 | Garcia et al. |
| 2016/0374088 A1 | 12/2016 | Garcia et al. |
| 2017/0079007 A1 | 3/2017 | Carbajal |
| 2017/0148467 A1* | 5/2017 | Franklin ................. G10L 25/39 |
| 2017/0238203 A1 | 8/2017 | Dzierwa et al. |
| 2017/0243138 A1 | 8/2017 | Dzierwa et al. |
| 2017/0243139 A1 | 8/2017 | Dzierwa et al. |
| 2017/0250766 A1 | 8/2017 | Dzierwa et al. |
| 2017/0289840 A1 | 10/2017 | Sung et al. |
| 2017/0290075 A1 | 10/2017 | Carbajal et al. |
| 2017/0374572 A1 | 12/2017 | Kleinbeck et al. |
| 2017/0374573 A1 | 12/2017 | Kleinbeck et al. |
| 2018/0014217 A1 | 1/2018 | Kleinbeck et al. |
| 2018/0024220 A1 | 1/2018 | Massarella et al. |
| 2018/0083721 A1 | 3/2018 | Wada et al. |
| 2018/0211179 A1 | 7/2018 | Dzierwa |
| 2018/0294901 A1 | 10/2018 | Garcia et al. |
| 2018/0331863 A1 | 11/2018 | Carbajal |
| 2019/0018103 A1* | 1/2019 | Qian ...................... G01S 19/48 |
| 2019/0064130 A1 | 2/2019 | Kanazawa et al. |
| 2019/0180630 A1 | 6/2019 | Kleinbeck |

OTHER PUBLICATIONS

Gary L. Sugar, System and method for locating wireless devices in an unsynchronized wireless network, U.S. Appl. No. 60/319,737, Provisional Patent Application filed on Nov. 27, 2002, Specification including the claims, abstracts, and drawings.

* cited by examiner

UNMANNED VEHICLE RECOGNITION AND THREAT MANAGEMENT

CROSS-REFERENCE TO RELATED APPLICATIONS

This application relates to and claims priority from the following applications. This application is a continuation of U.S. patent application Ser. No. 16/275,575 filed Feb. 14, 2019, which claims the benefit of U.S. Provisional Application 62/632,276 filed Feb. 19, 2018. U.S. patent application Ser. No. 16/275,575 also claims priority from and is a continuation-in-part of U.S. patent application Ser. No. 16/274,933 filed Feb. 13, 2019, which is a continuation-in-part of U.S. patent application Ser. No. 16/180,690 filed Nov. 5, 2018, which is a continuation-in-part of U.S. patent application Ser. No. 15/412,982 filed Jan. 23, 2017. U.S. patent application Ser. No. 16/180,690 also claims priority from U.S. Provisional Patent Application No. 62/722,420 filed Aug. 24, 2018. U.S. patent application Ser. No. 16/274,933 also claims the benefit of U.S. Provisional Application 62/632,276 filed Feb. 19, 2018. Each of the above-mentioned applications is incorporated herein by reference in its entirety.

BACKGROUND OF THE INVENTION

1. Field of the Invention

The present invention relates to systems and methods for unmanned vehicle recognition and threat management. More particularly, the systems and methods of the present invention are directed to unmanned vehicle detection, classification and direction finding.

2. Description of the Prior Art

Unmanned Aerial Vehicles (UAVs), commonly known as drones, have become readily available in commercial and retail stores. Detailed schematics for their control systems are available from many manufacturers and the internet along with Software Development Kits (SDKs). Rapid modifications are enabled by advancements in various technologies (e.g., 3D printing). UAVs can be modified to deploy dangerous actions and threaten societal securities. For example, UAVs can be modified to deliver dangerous payloads. It is no longer a question of if, it is now a question of when. Thus, it is imperative that organizations and governments take steps to protect critical assets (e.g., ports, power plants), structures (e.g., buildings, stadiums), and personnel and their citizens.

Exemplary US Patent Documents relevant to the prior art include:

U.S. Pat. No. 9,862,489 for "Method and apparatus for drone detection and disablement" by inventor Lee Weinstein et al., filed Feb. 7, 2016, describes a preferred embodiment of a method and apparatus for detection and disablement of an unidentified aerial vehicle (UAV) includes arrays of antenna elements receiving in two modalities (for instance radio frequency (RF) and acoustic modalities, or RF and optical modalities). Signal processing of outputs from multiple antenna arrays locates a potential UAV at specific coordinates within a volume of space under surveillance, and automatically aims video surveillance and a short-range projectile launcher at the UAV, and may automatically fire the projectile launcher to down the UAV.

U.S. Pat. No. 9,858,947 for "Drone detection and classification methods and apparatus" by inventor Brian Hearing et al., filed Nov. 24, 2015, describes a system, method, and apparatus for drone detection and classification. An example method includes receiving a sound signal in a microphone and recording, via a sound card, a digital sound sample of the sound signal, the digital sound sample having a predetermined duration. The method also includes processing, via a processor, the digital sound sample into a feature frequency spectrum. The method further includes applying, via the processor, broad spectrum matching to compare the feature frequency spectrum to at least one drone sound signature stored in a database, the at least one drone sound signature corresponding to a flight characteristic of a drone model. The method moreover includes, conditioned on matching the feature frequency spectrum to one of the drone sound signatures, transmitting, via the processor, an alert.

U.S. Pat. No. 9,767,699 for "System for and method of detecting drones" by inventor John W. Borghese et al., filed May 14, 2015, describes an apparatus and method can provide a warning of a drone or unmanned aerial vehicle in the vicinity of an airport. The apparatus can include at least one antenna directionally disposed at an along the approach or departure path and a detector configured to provide a warning of a presence of sense an unmanned aerial or drone. The warning can be provided in response to a radio frequency signal received by the at least one of the antenna being in a frequency band associated with a transmission frequency for the unmanned aerial vehicle or drone or in a frequency band associated with interaction from receive circuitry of the unmanned aerial vehicle or drone.

U.S. Pat. No. 9,715,009 for "Deterent for unmanned aerial systems" by inventor Dwaine A. Parker et al., filed Dec. 2, 2016, describes a system (100) for providing an integrated multi-sensor detection and countermeasure against commercial unmanned aerial systems/vehicles (44) and includes a detecting element (103, 104, 105), a tracking element (103, 104, 105) an identification element (103, 104, 105) and an interdiction element (102). The detecting element detects an unmanned aerial vehicle in flight in the region of, or approaching, a property, place, event or very important person. The tracking element determines the exact location of the unmanned aerial vehicle. The identification/classification element utilizing data from the other elements generates the identification and threat assessment of the UAS. The interdiction element, based on automated algorithms can either direct the unmanned aerial vehicle away from the property, place, event or very important person in a non-destructive manner, or can disable the unmanned aerial vehicle in a destructive manner. The interdiction process may be over ridden by intervention by a System Operator/HiL.

U.S. Pat. No. 9,529,360 for "System and method for detecting and defeating a drone" by inventor Howard Melamed et al., filed Apr. 22, 2015, describes a system for detecting and defeating a drone. The system has a detection antenna array structured and configured to detect the drone and the drone control signal over a 360 degree field relative to the detection antenna array including detecting the directionality of the drone. The system also includes a neutralization system structured and configured in a communicating relation with the detection antenna array. The neutralization system has a transmission antenna structured to transmit an override signal aimed at the direction of the drone, an amplifier configured to boost the gain of the override signal to exceed the signal strength of the drone control signal, and a processing device configured to create and effect the transmission of the override signal. The invention is also directed to a method for detecting and defeating a drone.

U.S. Publication No. 2017/0358103 for "Systems and Methods for Tracking Moving Objects" by inventor Michael Shao et al., filed Jun. 9, 2017, describes systems and methods for tracking moving objects in accordance with embodiments of the invention. In one embodiment of the invention, an object tracking system comprises a processor, a communications interface, and a memory configured to store an object tracking application. The object tracking application configures the processor to receive a sequence of images; estimate and subtract background pixel values from pixels in a sequence of images; compute sets of summed intensity values for different per frame pixel offsets from a sequence of images; identify summed intensity values from a set of summed intensity values exceeding a threshold; cluster identified summed intensity values exceeding the threshold corresponding to single moving objects; and identify a location of at least one moving object in an image based on at least one summed intensity value cluster.

U.S. Publication No. 2017/0261613 for "Counter drone system" by inventor Brian R. Van Voorst, filed Feb. 27, 2017, describes that a counter drone system includes a cueing sensor to detect the presence of an object wherein the cueing sensor cues the presence of a target drone, a long range LIDAR system having a sensor pointed in a direction of the target drone to acquire and track at long range the target drone to provide an accurate location of the target drone wherein once a track is acquired, the motion of the target drone is used to maintain the track of the target drone and a threat detector wherein LIDAR data is provided to the threat detector to determine if the target drone is a threat.

U.S. Publication No. 2017/0261604 for "Intercept drone tasked to location of lidar tracked drone" by inventor Brian Van Voorst, filed Feb. 27, 2017, describes that a system includes a long range LIDAR tracking system to track a target drone and provide detection and tracking information of the target drone; a control system to process the detection and tracking information and provide guidance information to intercept the target drone; and a high powered intercept drone controlled by supervised autonomy, the supervised autonomy provided by processing the detection and tracking information of the target drone and sending guidance information to the intercept drone to direct the intercept drone to the target drone.

U.S. Publication No. 2017/0039413 for "Commercial drone detection" by inventor Gary J. Nadler, filed Aug. 3, 2015, describes one embodiment provides a method of capturing the presence of a drone, including: collecting, using at least one sensor, data associated with an aerial object; analyzing, using a processor, the data to determine at least one characteristic of the aerial object; accessing, in a database, a library of stored characteristics of commercially available drones; determining, based on the analyzing, if the at least one characteristic of the aerial object matches a characteristic of a commercially available drone; and responsive to the determining, generating an indication of a positive match. Other aspects are described and claimed.

SUMMARY OF THE INVENTION

The present invention provides systems and methods for unmanned vehicle recognition. In one embodiment, a multiplicity of receivers captures RF data and transmits the RF data to at least one node device. The at least one node device comprises a signal processing engine, a detection engine, a classification engine, and a direction finding engine. The at least one node device is configured with an artificial intelligence algorithm. The detection engine and classification engine are trained to detect and classify signals from unmanned vehicles and their controllers based on processed data from the signal processing engine. The direction finding engine is operable to provide lines of bearing for detected unmanned vehicles. A display and control unit is in network communication with the at least one node device for displaying locations and other related data for the detected unmanned vehicles.

These and other aspects of the present invention will become apparent to those skilled in the art after a reading of the following description of the preferred embodiment when considered with the drawings, as they support the claimed invention.

DETAILED DESCRIPTION

Figure 1:
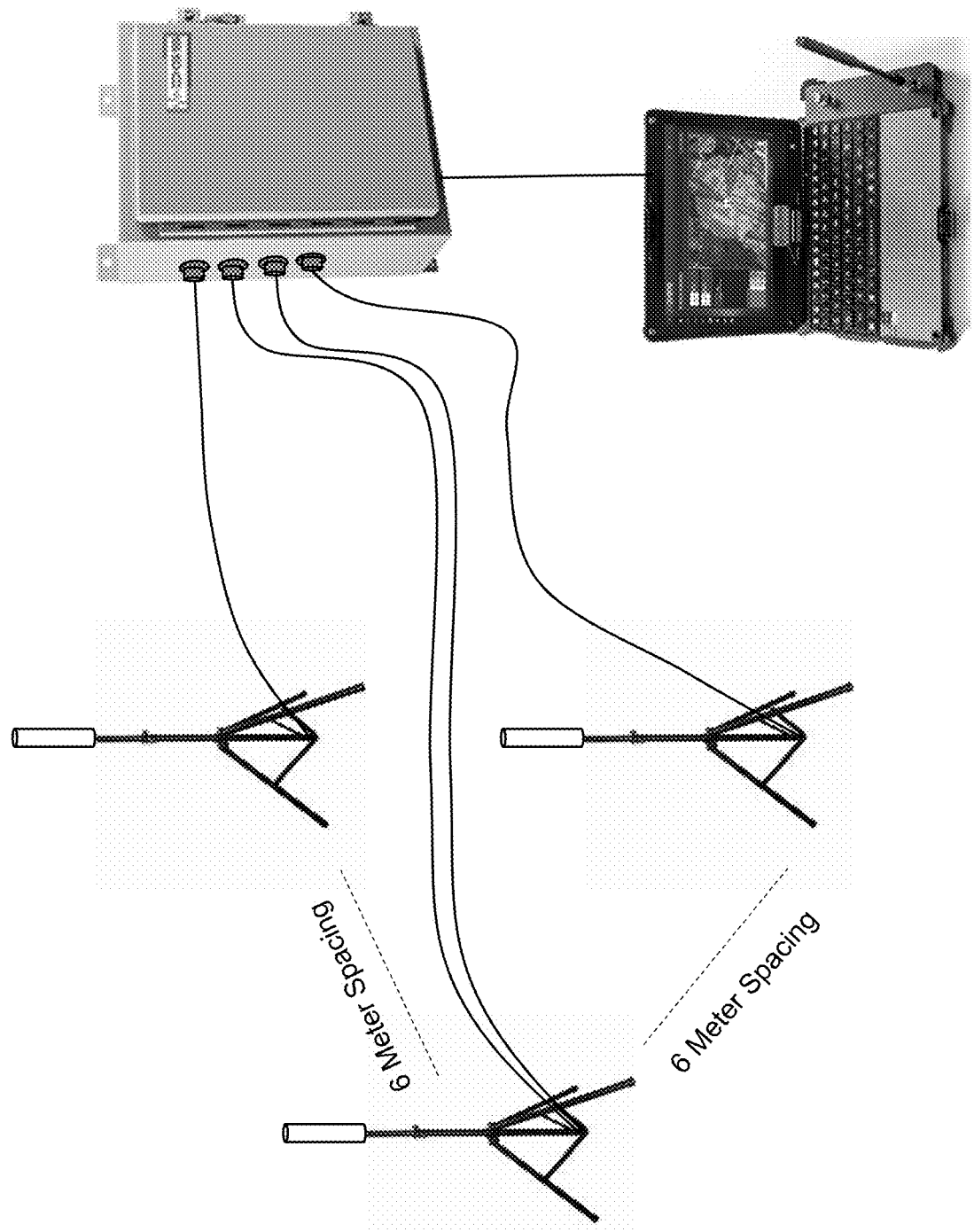
FIG. 1 is a system for unmanned vehicle recognition according to one embodiment of the present invention.

The present invention provides systems and methods for unmanned vehicle recognition. The present invention relates to automatic signal detection, temporal feature extraction, geolocation, and edge processing disclosed in U.S. patent application Ser. No. 15/412,982 filed Jan. 23, 2017, U.S. patent application Ser. No. 15/478,916 filed Apr. 4, 2017, U.S. patent application Ser. No. 15/681,521 filed Aug. 21, 2017, U.S. patent application Ser. No. 15/681,540 filed Aug. 21, 2017, and U.S. patent application Ser. No. 15/681,558 filed Aug. 21, 2017, each of which is incorporated herein by reference in its entirety.

Currently, commercial and retail UAVs dominate frequencies including 433 MHz industrial, scientific, and medical radio band (ISM Band) Region 1, 900 MHz ISM Band Region 1, 2, 3 (varies by country), 2.4 GHz (channels 1-14), 5 GHz (channels 7-165 most predominant), and 3.6 GHz (channels 131-183). Modulation types used by commercial and retail UAVs include Direct Sequence Spread Spectrum (DSSS), Orthogonal Frequency Division Multiplexing (OFDM), Frequency Hopping Spread Spectrum (FHSS), Fataba Advanced Spread Spectrum Technology (FASST).

Many counter UAV systems in the prior art focus on the 2.4 GHz and 5.8 GHz bands utilizing demodulation and decryption of radio frequency (RF) signals to detect and analyze each signal to determine if it is related to a UAV.

The present invention provides systems and methods for unmanned vehicle recognition including detection, classification and direction finding. Unmanned vehicles comprise aerial, terrestrial or water borne unmanned vehicles. The systems and methods for unmanned vehicle recognition are operable to counter threats from the aerial, terrestrial or water borne unmanned vehicles.

In one embodiment, a multiplicity of receivers captures RF data and transmits the RF data to at least one node device. The at least one node device comprises a signal processing engine, a detection engine, a classification engine, and a direction finding engine. The at least one node device is configured with an artificial intelligence algorithm. The detection engine and classification engine are trained to detect and classify signals from unmanned vehicles and their controllers based on processed data from the signal processing engine. The direction finding engine is operable to provide lines of bearing for detected unmanned vehicles. A display and control unit is in network communication with the at least one node device for displaying locations and other related data for the detected unmanned vehicles.

In one embodiment, the present invention provides systems and methods for unmanned vehicle (UV) recognition in a radio frequency (RF) environment. a multiplicity of RF receivers and a displaying device are in network communication with a multiplicity of node devices. The multiplicity of RF receivers is operable to capture the RF data in the RF environment, convert the RF data to fast Fourier transform (FFT) data, and transmit the FFT data to the multiplicity of node devices. The multiplicity of node devices each comprises a signal processing engine, a detection engine, a classification engine, a direction-finding engine, and at least one artificial intelligence (AI) engine. The signal processing engine is operable to average the FFT data into at least one tile. The detection engine is operable to group the FFT data into discrete FFT bins over time, calculate average and standard deviation of power for the discrete FFT bins, and identify at least one signal related to at least one UV and/or corresponding at least one UV controller. The at least one AI engine is operable to generate an output for each of the at least one tile to identify at least one UV and corresponding at least one UV controller with a probability, and calculate an average probability based on the output from each of the at least one tile. The classification engine is operable to classify the at least one UV and/or the at least one UV controller by comparing the at least one signal to classification data stored in a classification library in real time or near real time. The direction-finding engine is operable to calculate a line of bearing for the at least one UV. The displaying device is operable to display a classification of the at least one UV and/or the at least one UV controller the line of bearing of the at least one UV. Each of the at least one tile is visually represented in a waterfall image via a graphical user interface on the displaying device.

FIG. 1 illustrates a system for unmanned vehicle recognition according to one embodiment of the present invention. The system includes a multiplicity of antennas, a receiver and processing unit, and a display and control unit. In one embodiment, there are four multiband omnidirectional antennas. In one embodiment, three multiband omnidirectional antennas are positioned to form an equilateral with 6 meters spacing as illustrated in FIG. 1 as an example. The receiver and processing unit includes a signal processing engine, a UAV detection engine, a UAV classification engine, a direction finding processing engine, and an internal GPS. The receiver and processing unit is operable to receive RF data from the antennas and automatically process the RF data for UAV detection and classification and direction finding. The display and control unit includes a human interface display. In one embodiment, the human interface display is provided by a remote web-based interface. The display and control unit is operable to display lines of bearings for detected UAVs and controllers, classification for detected UAVs and controllers, received signal strength (RSS) values, and operating frequencies. In one embodiment, the display and control unit is SigBase 4000 as shown in FIG. 1. In another embodiment, any computer, laptop, or tablet configured with the human interface display of the present invention is operable to function as a display and control unit. In one embodiment, the receiver and processing unit is a node device, and there are multiple node devices communicating with each other and forming a group of networked nodes for UAV detection, classification, and direction finding.

Figure 2:
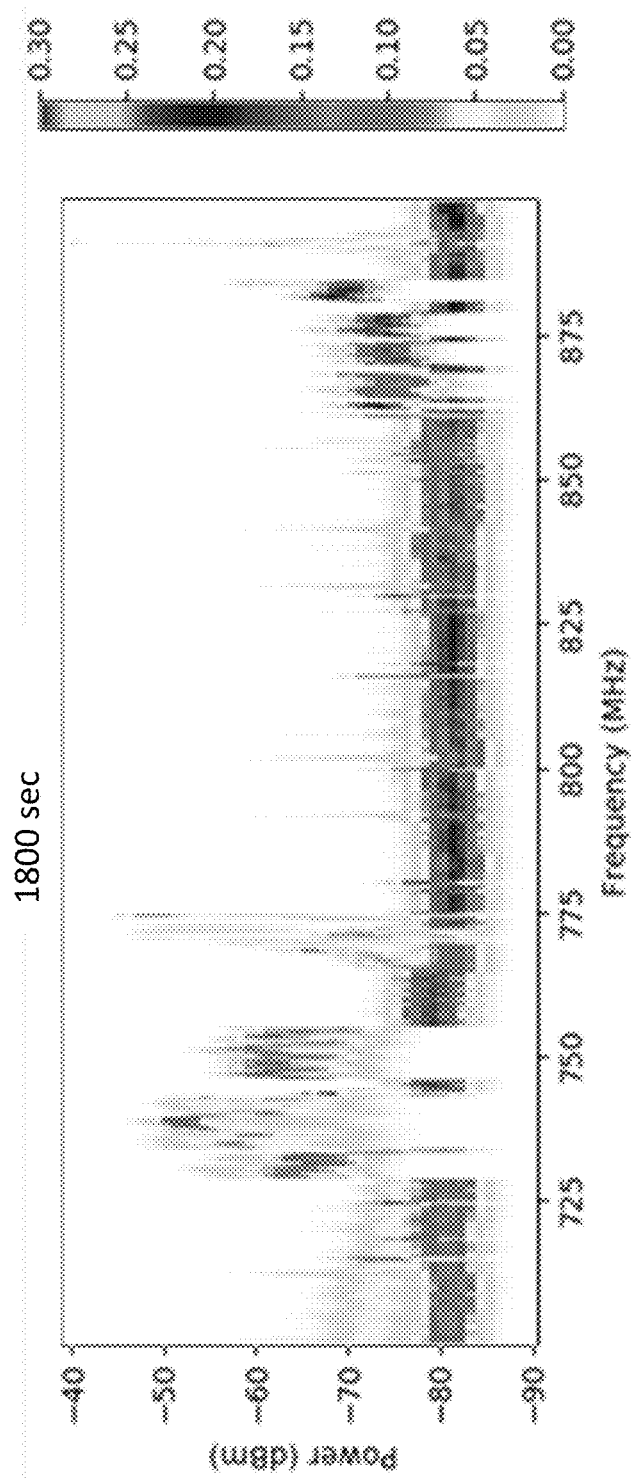
FIG. 2 illustrates signal characterization within a spectrum from 700 MHz to 900 MHz.

The present invention provides a more efficient methodology for UAV detection and identification, which takes advantage of Fast Fourier Transform (FFT) over a short period of time and its derivation. RF data received from antennas are directly converted to FFT data with finer granularity. This allows rapid identification of protocols used by high threat drones without demodulation, and the identification is probability based. An analytics engine is operable to perform near real-time analysis and characterize signals within the spectrum under observation. FIG. 2 illustrates signal characterization within a spectrum from 700 MHz to 900 MHz. Temporal feature extraction is applied for signal characterization, which is described in U.S. patent application Ser. No. 15/412,982 filed Jan. 23, 2017, U.S. patent application Ser. No. 15/681,521 filed Aug. 21, 2017, U.S. patent application Ser. No. 15/681,540 filed Aug. 21, 2017, U.S. patent application Ser. No. 15/681,558 filed Aug. 21, 2017, each of which is incorporated herein by reference in its entirety.

Advantageously, multiple receivers in the present invention work together to ingest spectral activities across large blocks of spectrum. The multiple receivers have an instantaneous bandwidth from 40 MHz to 500 MHz. In one embodiment, the multiple receivers are configurable in 40 MHz and 125 MHz segment building blocks. Input data are converted directly to FFT data and fed into process engines, which significantly decreases latency. The process engines are designed for rapid identification of signals of interest (SOI). When an SOI is detected, a direction finding process is initiated autonomously. In one embodiment, the direction finding process is configurable by an operator.

There are multiple types of communications links utilized for command and control of an unmanned vehicle. Although several cost-effective radio communication (RC) protocols are gaining global popularity, Wi-Fi is still the most popular protocol for command and control of UAVs and camera systems. A remote controller of a UAV acts as a Wi-Fi access point and the UAV acts as a client. There are several limiting factors for Wi-Fi-based UAVs. For example, the operational range of a Wi-Fi-based UAV is typically limited to 150 feet (46 m) indoor and 300 feet (92 m) outdoor. There is significant latency for control and video behaviors. Interference by other Wi-Fi devices affects operational continuity of the Wi-Fi-based UAVs.

Demand in the UAV user community has made more professional-level protocols available in the commercial and retail markets. By way of example but not limitation, two common RC protocols used for UAVs are Lightbridge and OcuSync. Enhancements in drone technology inevitably increases the capability of drones for use in industrial espionage and as weapons for nefarious activities.

Lightbridge is developed for long range and reliable communication. Communication is available within a range up to 5 km. Lightbridge supports 8 selectable channels, and the selection can be manual or automatic. Drones with Lightbridge protocol also have the ability to assess interference and move to alternate channels for greater quality.

OcuSync is developed based on the LightBridge protocol. OcuSync uses effective digital compression and other improvements, which decreases knowledge required to operate. OcuSync provides reliable HD and UHD video, and OcuSync-based drones can be operated in areas with greater dynamic interference. Ocusync improves command and control efficiencies and reduces latency. With OcuSync, video communications are improved substantially, operational range is increased, command and control recovery are enhanced when interference occurs.

The systems and methods of the present invention for unmanned vehicle recognition are operable to detect and classify UAVs at a distance, provide directions of the UAVs, and take defensive measures to mitigate risks. The detection and classification are fast, which provides more time to react and respond to threats. Exact detection range is based upon selection of antenna systems, topology, morphology, and client criteria. Classification of the detected UAVs provides knowledge of the UAVs and defines effective actions and capabilities for countering UAV threats. In one embodiment, the direction information of the UAVs provides orientation within the environment based on the location of the UAV detector.

In one embodiment, the systems and methods of the present invention provides unmanned vehicle recognition solution targeting radio controlled and Wi-Fi based drones. The overall system is capable of surveying the spectrum from 20 MHz to 6 GHz, not just the common 2.4 GHz and 5.8 GHz areas as in the prior art. In one embodiment, the systems and methods of the present invention are applied to address 2 major categories: RC-based UAV systems and Wi-Fi-based UAV systems. In one embodiment, UAV systems utilize RC protocols comprising LightBridge and OcuSync. In another embodiment, UAV systems are Wi-Fi based, for example but not for limitation, 3DR Solo and Parrot SkyController. The systems and methods of the present invention are operable to detect UAVs and their controllers by protocol.

The systems and methods of the present invention maintain a state-of-the-art learning system and library for classifying detected signals by manufacturer and controller type. The state-of-the-art learning system and library are updated as new protocols emerge.

In one embodiment, classification by protocol chipset is utilized to provide valuable intelligence and knowledge for risk mitigation and threat defense. The valuable intelligence and knowledge include effective operational range, supported peripherals (e.g., external or internal camera, barometers, GPS and dead reckoning capabilities), integrated obstacle avoidance systems, and interference mitigation techniques.

Figure 3:
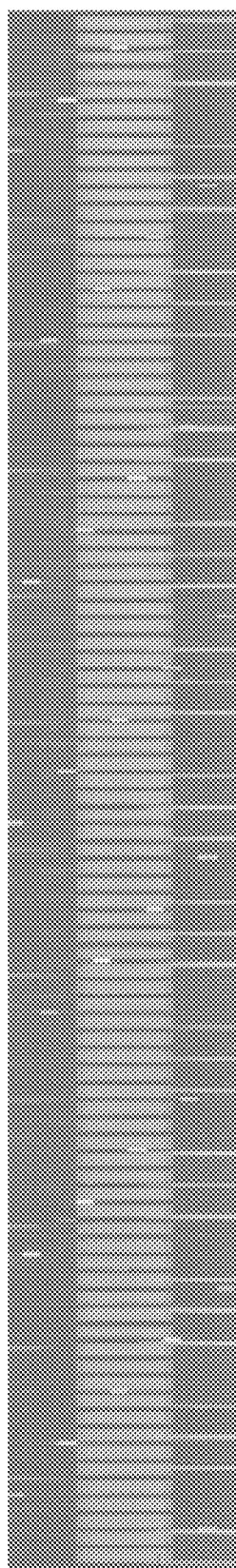
FIG. 3 is an illustration of Phantom 4 controller and drone signals.
Figure 4:
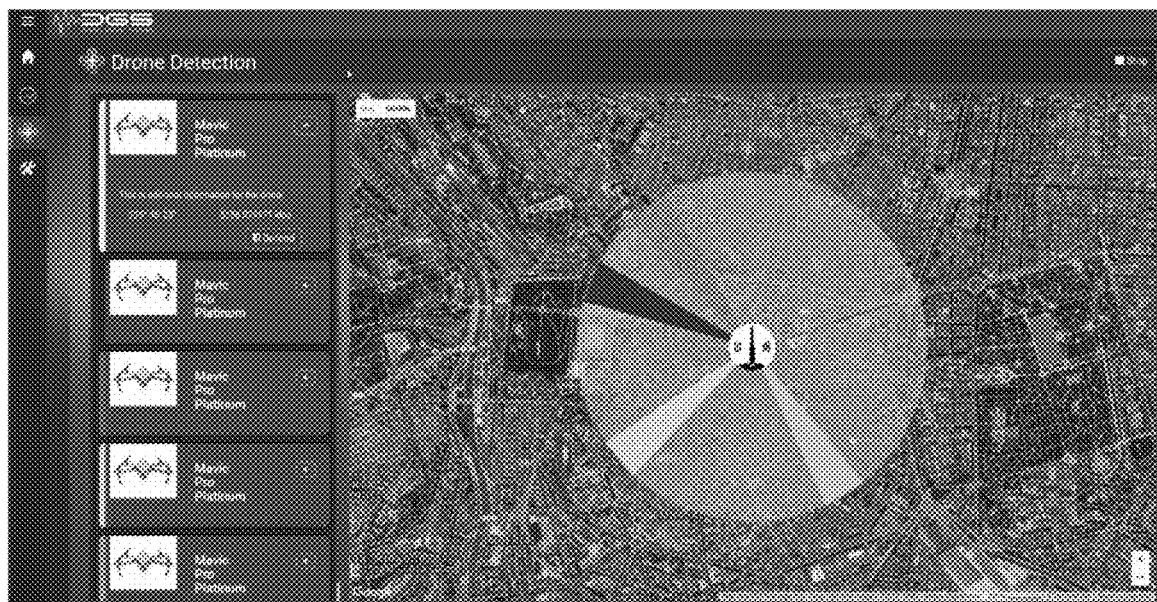
FIG. 4 is a human interface display for drone detection according to one embodiment of the present invention.
Figure 4:
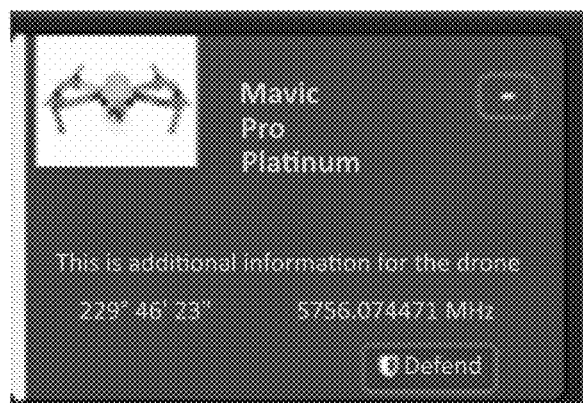

The state-of-the-art learning system of the present invention is highly accurate and capable of assessing detected UAV signals and/or controller signals for classification in less than a few seconds with a high confidence level. The state-of-the-art learning system is operable to discriminate changes in the environment for non-drone signals as well as drone signals. FIG. 3 is an illustration of Phantom 4 controller and drone signals. A human interface is operable to display the classification results. FIG. 4 illustrates a human interface display for drone detection according to one embodiment of the present invention.

It is difficult to recognize commercial and retail drones with the naked eye over 100 meters. It is critical to obtain a vector to the target for situational awareness and defense execution. The systems and methods of the present invention provides lines of bearing for direction finding for multiple UAVs flying simultaneously. Each line of bearing is color coded for display. Angles, along with frequencies utilized for uplink and downlink, are also displayed on the human interface.

Once a UAV is detected and classified, an alert is posted to a counter UAV system operator (e.g., a network operation center, an individual operator) including azimuth of the UAV and other information. The alert is transmitted via email, short message service (SMS) or third-party system integration. The counter UAV system is operable to engage an intercession transmission, which will disrupt the communication between the UAV and its controller. When the communication between the UAV and its controller is intercepted, the UAV will invoke certain safety protocols, such as reduce height and hover, land, or return to the launch point. The counter UAV system may have certain restrictions based on country and classification of the UAV.

In one embodiment, the systems and methods of the present invention are operable to update the UAV library with emerging protocols for classification purposes, and refine the learning engine for wideband spectrum analysis for other potential UAV signatures, emerging protocols and technologies. In other words, the systems and methods of the present invention are adaptable to any new and emerging protocols and technologies developed for unmanned vehicles. In one embodiment, multiple node devices in the present invention are deployed to operate as a group of networked nodes. In one embodiment, the group of networked nodes are operable to estimate geographical locations for unmanned vehicles. In one embodiment, two node devices are operable to provide a single line of bearing and approximate a geographical location of a detected drone or controller. The more node devices there are in the group of network nodes, the more lines of bearing can be provided, and the more accurate the geographical location is estimated for the detected drone or controller. In one embodiment, the geolocation function provides altitude and distance of a targeted drone.

In one embodiment, the counter UAV system in the present invention is operable to alert when unexpected signal characteristics are detected in 2.4 GHz and 5.8 GHz areas and classify the unexpected signal characteristics as potential UAV activities. In another embodiment, the counter UAV system in the present invention is operable to alert when unexpected signal characteristics are detected anywhere from 20 MHz to 6 GHz and classify the unexpected signal characteristics as potential UAV activities. In another embodiment, the counter UAV system in the present invention is operable to classify the unexpected signal characteristics as potential UAV activities when unexpected signal characteristics are detected anywhere from 40 MHz to 6 GHz. The automatic signal detection engine and analytics engine are enhanced in the counter UAV system to recognize potential UAV activities across a great portion of the spectrum. In one embodiment, any blocks of spectrum from 40 MHz to 6 GHz can be selected for UAV recognition.

In one embodiment, vector-based information including inclinations, declinations, topology deviations, and user configurable Northing map orientation is added to the WGS84 mapping system for direction finding and location estimation. In one embodiment, earth-centered earth-fixed vector analysis is provided for multi-node systems to estimate UAV locations, derive UAV velocities from position changes over time, and determine UAV trajectory vectors in fixed nodal processing. In one embodiment, a group of networked node devices are operable to continually provide lines of bearing over time, approximate geographical locations of a detected unmanned vehicle on or above the earth, and track the movement of the detected unmanned vehicle from one estimated location to another. In one embodiment, the group of networked node devices are operable to determine velocities of the detected unmanned vehicle based on estimated locations and travel time. In one embodiment, the group of networked node devices are operable to estimate a trajectory of the detected unmanned vehicle based on the estimated geographical locations over time. In one embodiment, the group of networked node devices are operable to estimate accelerations and decelerations of the unmanned vehicle based on the velocities of the unmanned vehicles over time.

In one embodiment, the systems and methods of the present invention are operable for UAV detection and direction finding for different modulation schemes including but not limited to DSSS, OFDM, FHSS, FASST, etc. In one embodiment, the counter UAV system in the present invention is configured with cameras for motion detection. The cameras have both day and night vision.

Figure 5:
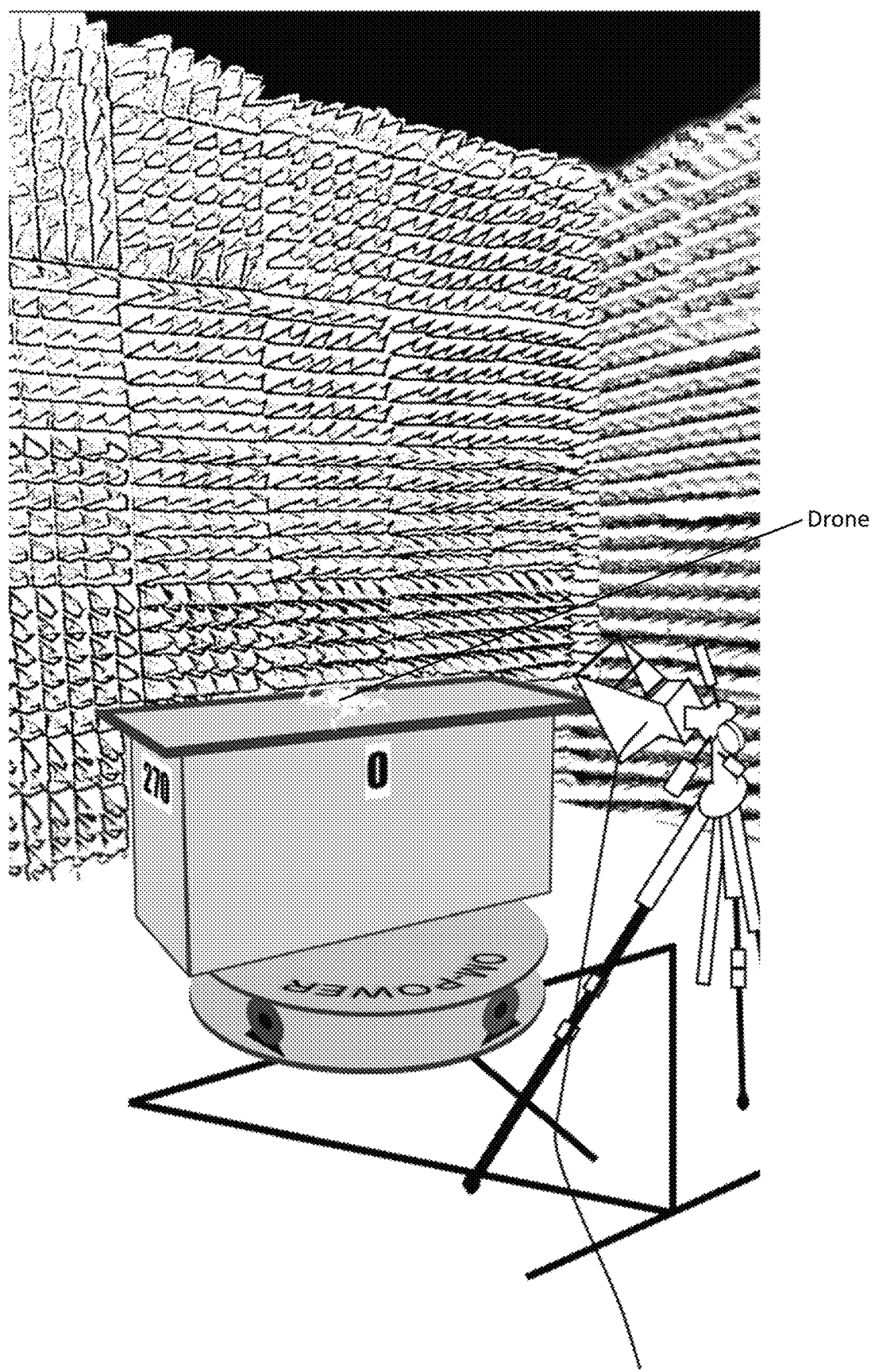
FIG. 5 shows a setup for RF data capture in an Anechoic Chamber according to one embodiment of the present invention.
Figure 6:
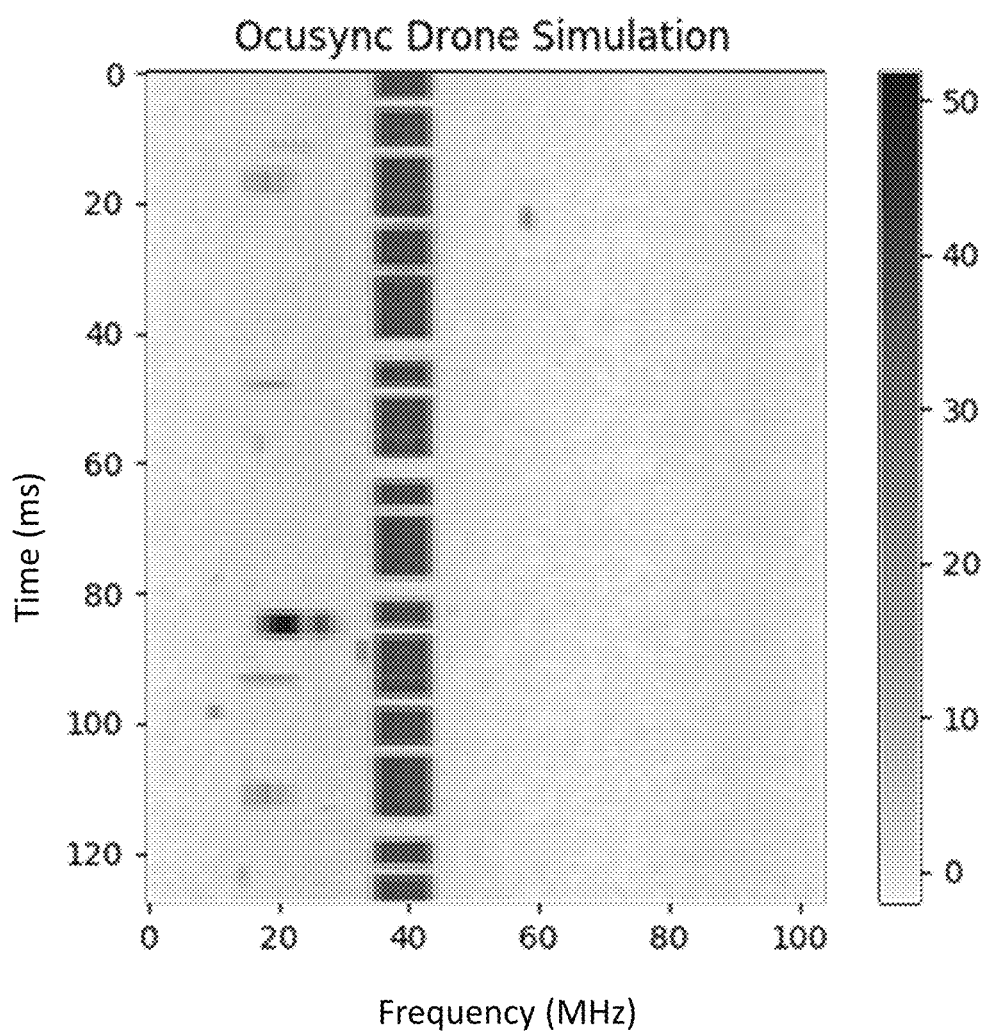
FIG. 6 illustrates a simulation for fading and channel hopping of an OcuSync drone.

In one embodiment, systems and methods of the present invention provides training for unmanned vehicle recognition. RF data is captured for a Phantom 3 drone and its controller and a Phantom 4 drone and its controller, both of which use Lightbridge protocol. RF data is also captured for a Mavic Pro drone and its controller, which uses OcuSync protocol. The RF data is recorded at different channels, different RF bandwidths, and different video quality settings inside and outside an Anechoic Chamber. FIG. 5 shows a setup for RF data capture in an Anechoic Chamber according to one embodiment of the present invention. The recordings are overlaid on the RF environment, and fading and channel hopping are simulated. FIG. 6 illustrates a simulation for fading and channel hopping of an OcuSync drone.

Figure 7:
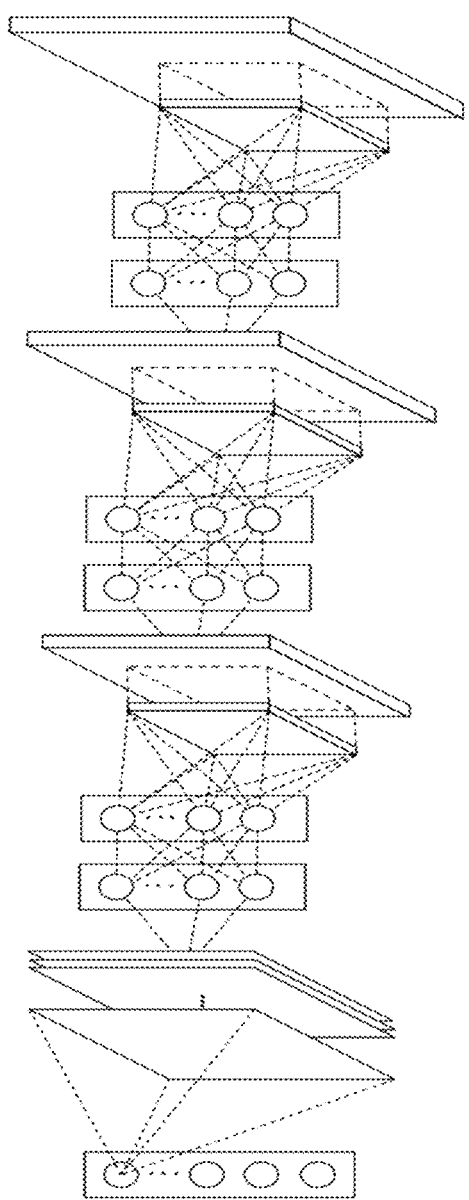
FIG. 7 is an illustration of an inception based convolutional neural network.

In one embodiment, the recorded RF data is used to train and calibrate an inception based convolutional neural network comprised in a drone detection system. FIG. 7 is an illustration of an inception based convolutional neural network. U.S. Patent Publication No. 2018/0137406 titled "Efficient Convolutional Neural Networks and Techniques to Reduce Associated Computational Costs" is incorporated herein by reference in its entirety. The inception based convolutional neural network generates probabilities that drones or their controllers are detected. The detection probabilities are updated multiple times per second.

The trained inception based convolutional neural network is operable to identify Lightbridge 1 controller and drone, Lightbridge 2 controller and drone, and OcuSync controller and drone. The trained inception based convolutional neural network is operable to identify Lightbridge and Ocusync controllers and drones at the same time. In one embodiment, the drone detection system comprising the trained inception based convolutional neural network is operable to search an instantaneous bandwidth of 147.2 MHz.

In one embodiment, the drone detection system of the present invention includes an artificial intelligence (AI) algorithm running on a single board computer (e.g., Nvidia Jetson TX2) with an execution time less than 10 ms. The drone detection system is operable to separate Phantom 3 and Phantom 4 controllers. Waveforms for Phantom 3 and Phantom 4 controllers are sufficiently different to assign separate probabilities.

Figure 8:
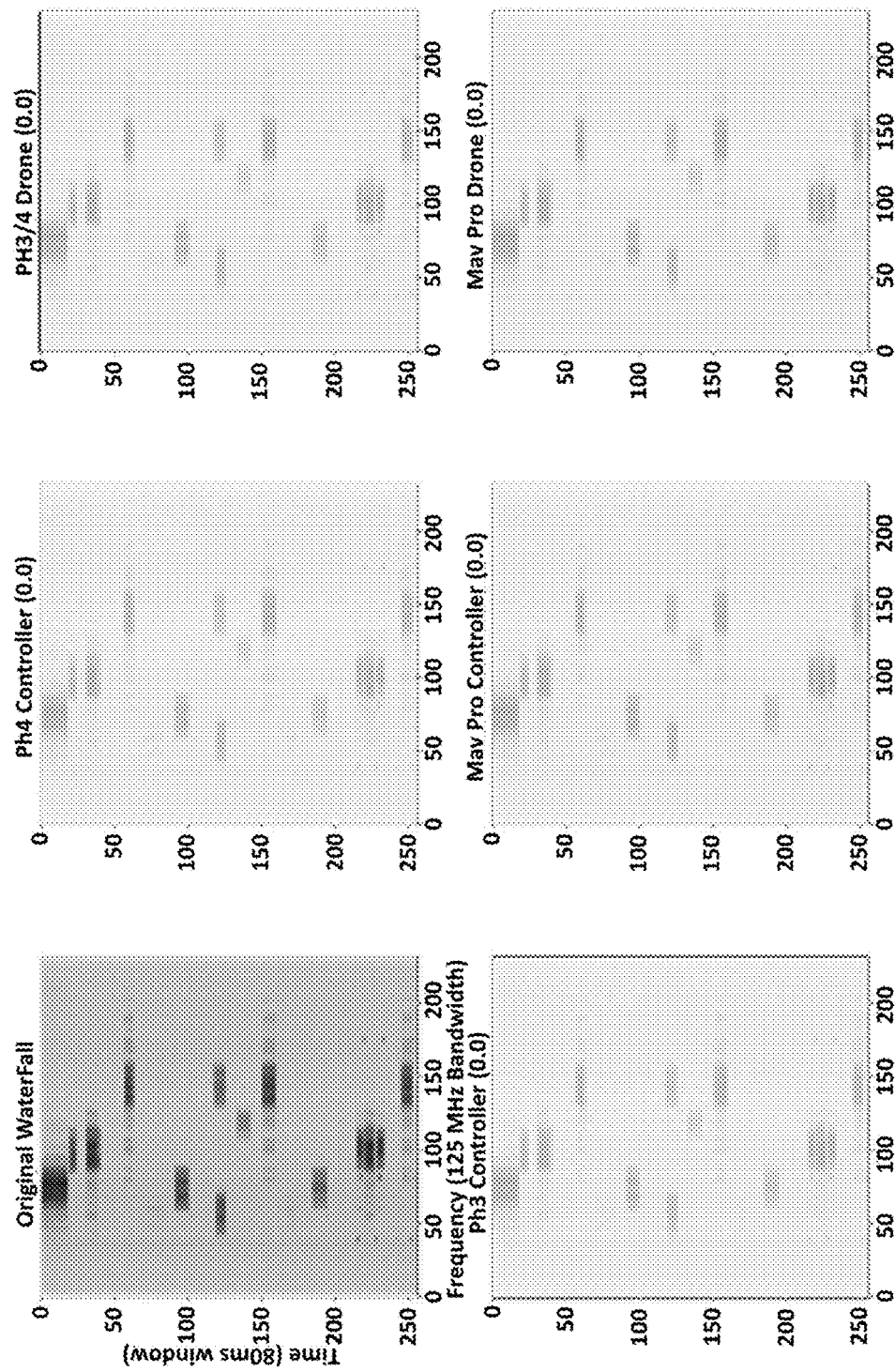
FIG. 8 illustrates a scenario for an RF environment with just noise.
Figure 9:
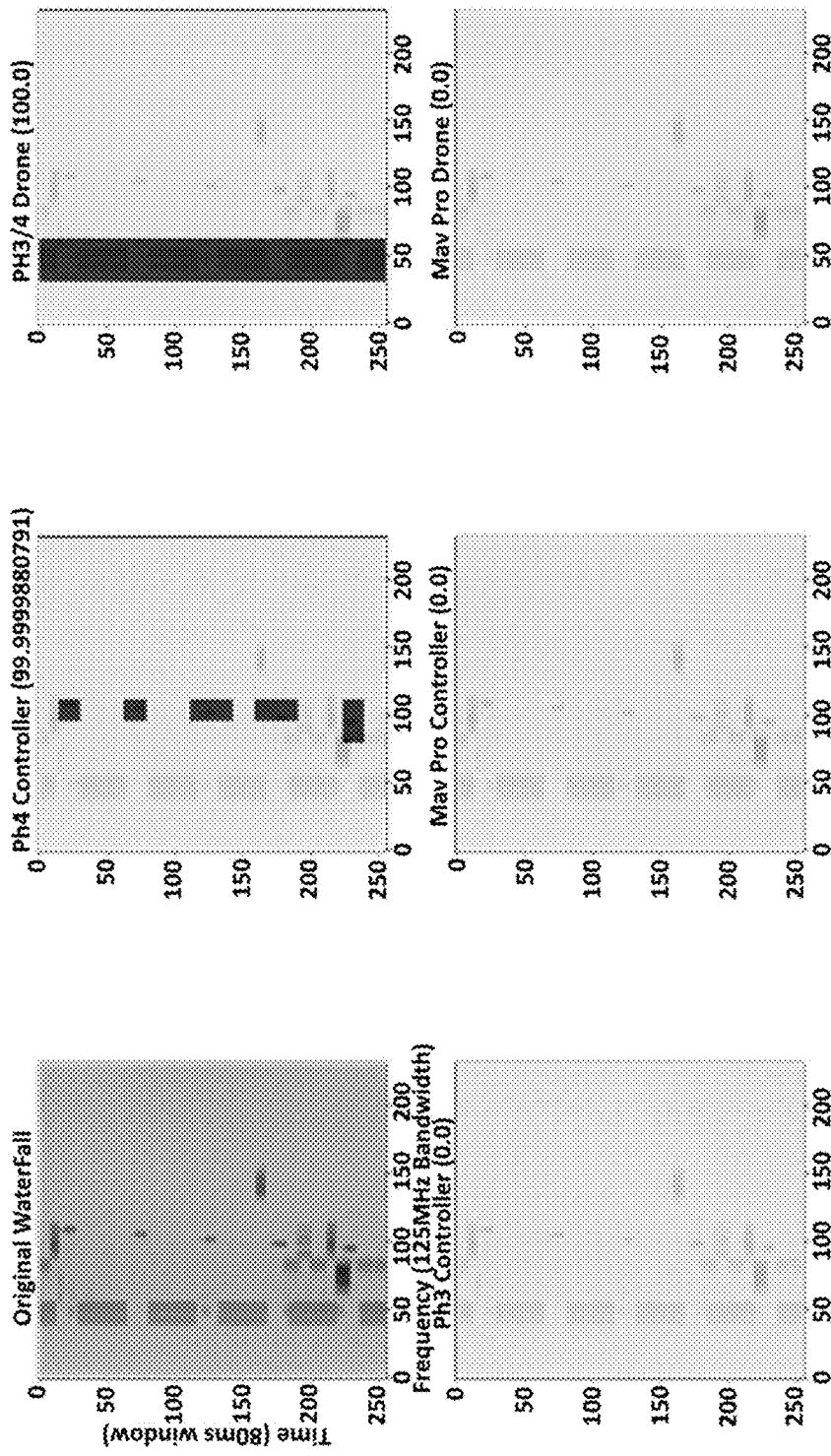
FIG. 9 illustrates a scenario for an RF environment with a Phantom 4 controller and drone.
Figure 10:
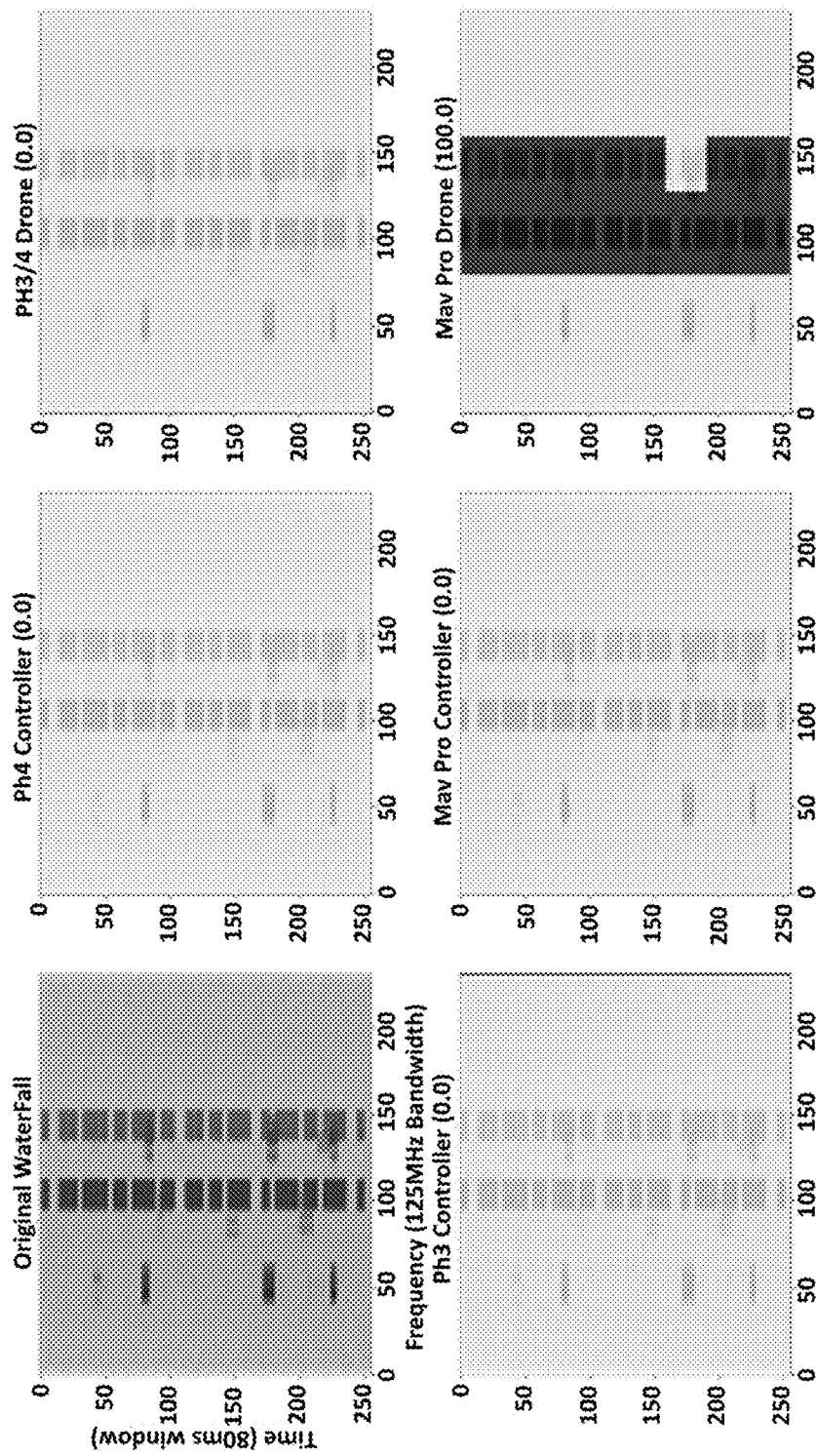
FIG. 10 illustrates a scenario for an RF environment with two Mavic Pro drones.
Figure 11:
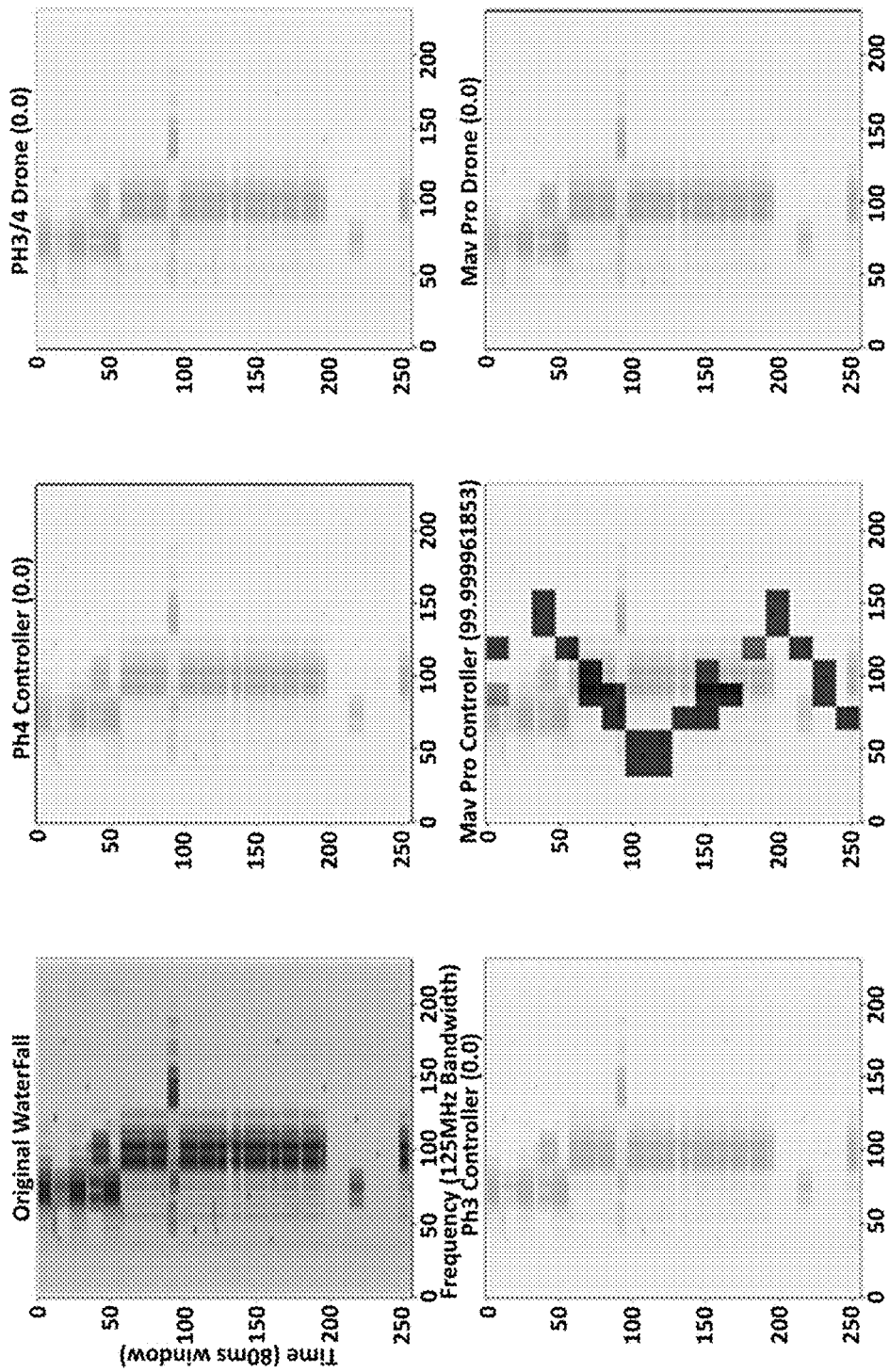
FIG. 11 illustrates a scenario for an RF environment with a Mavic Pro controller only.
Figure 12:
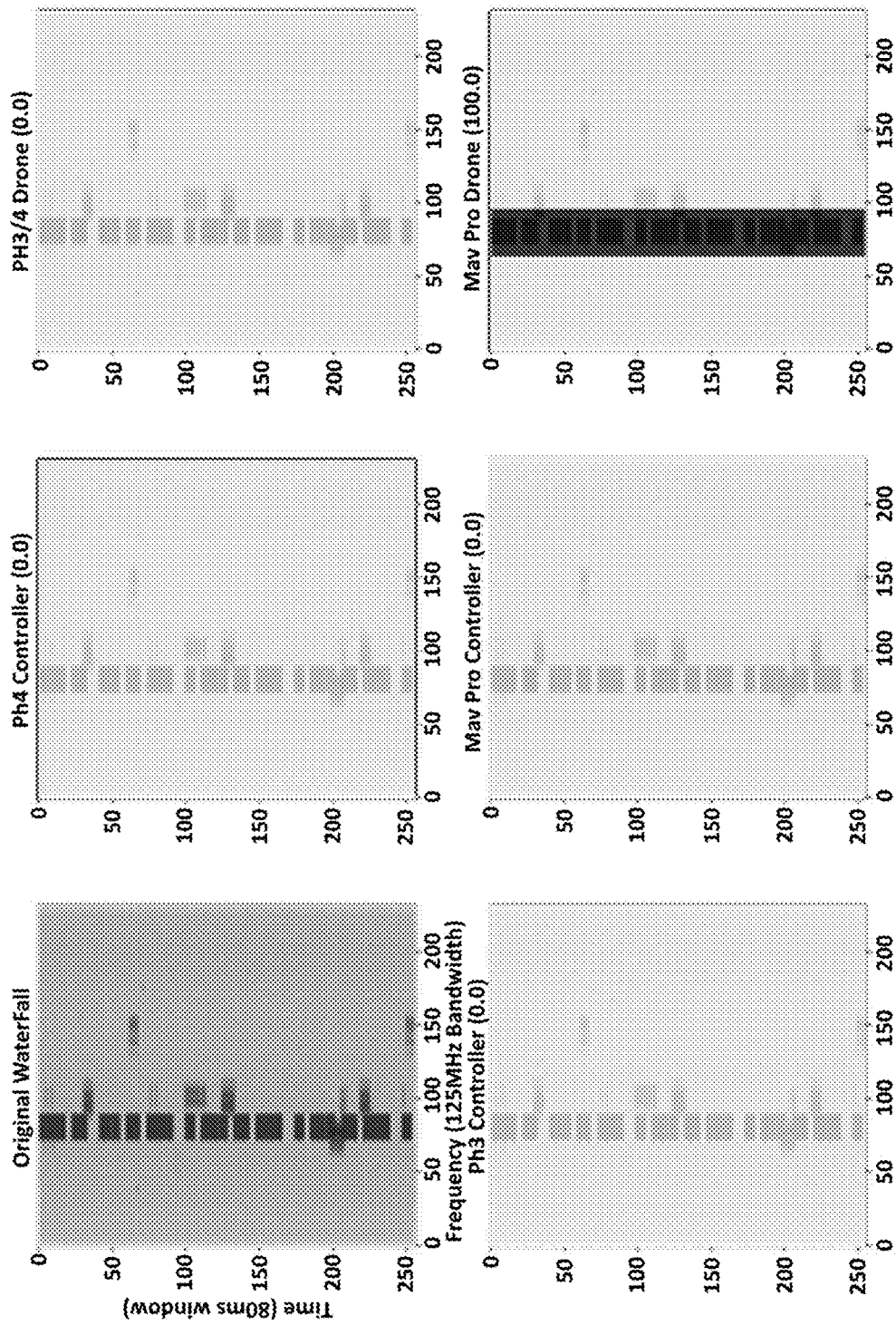
FIG. 12 illustrates a scenario for an RF environment with one Mavic Pro drone only.
Figure 13:
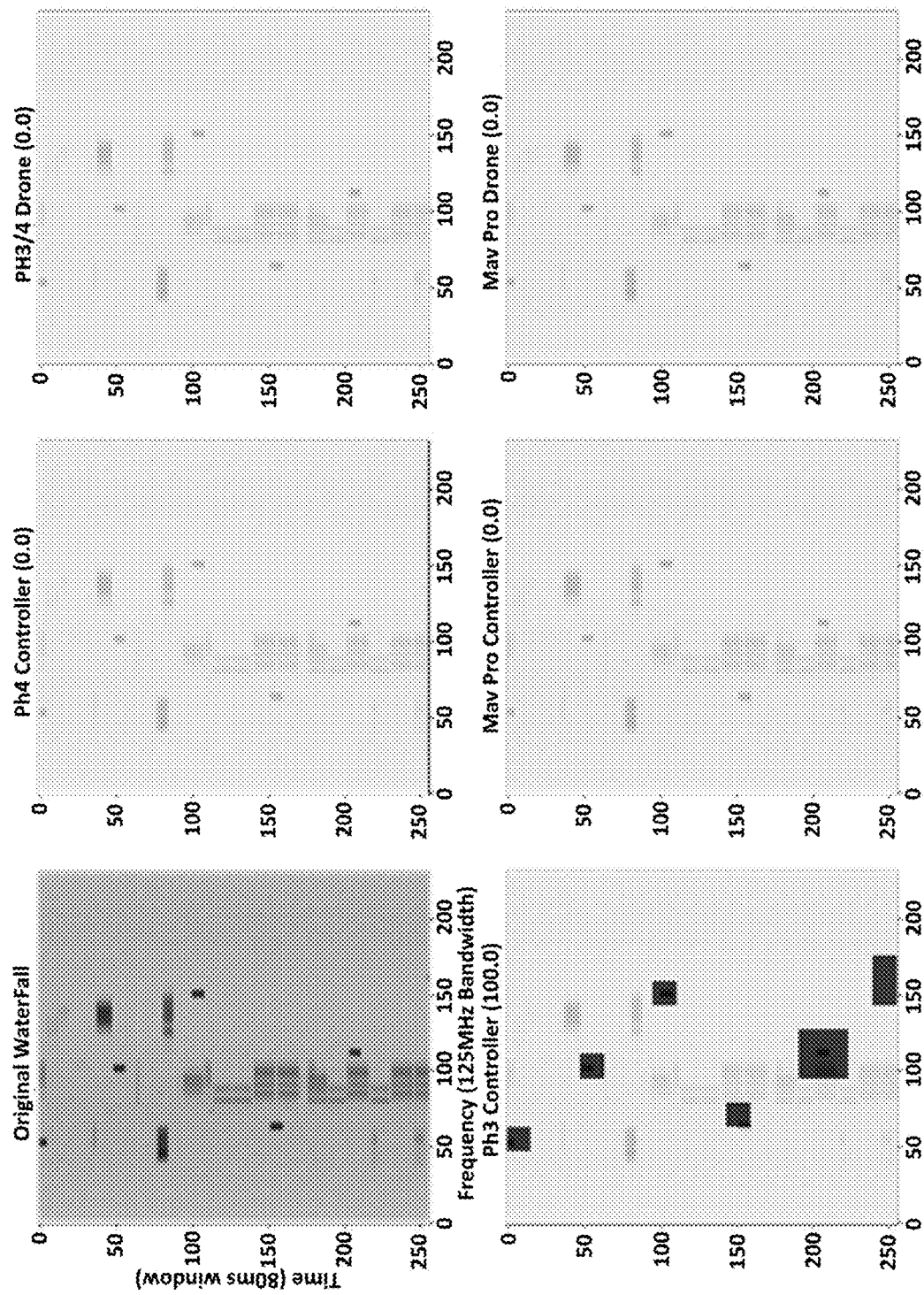
FIG. 13 illustrates a scenario for an RF environment with one Phantom 3 controller only.
Figure 14:
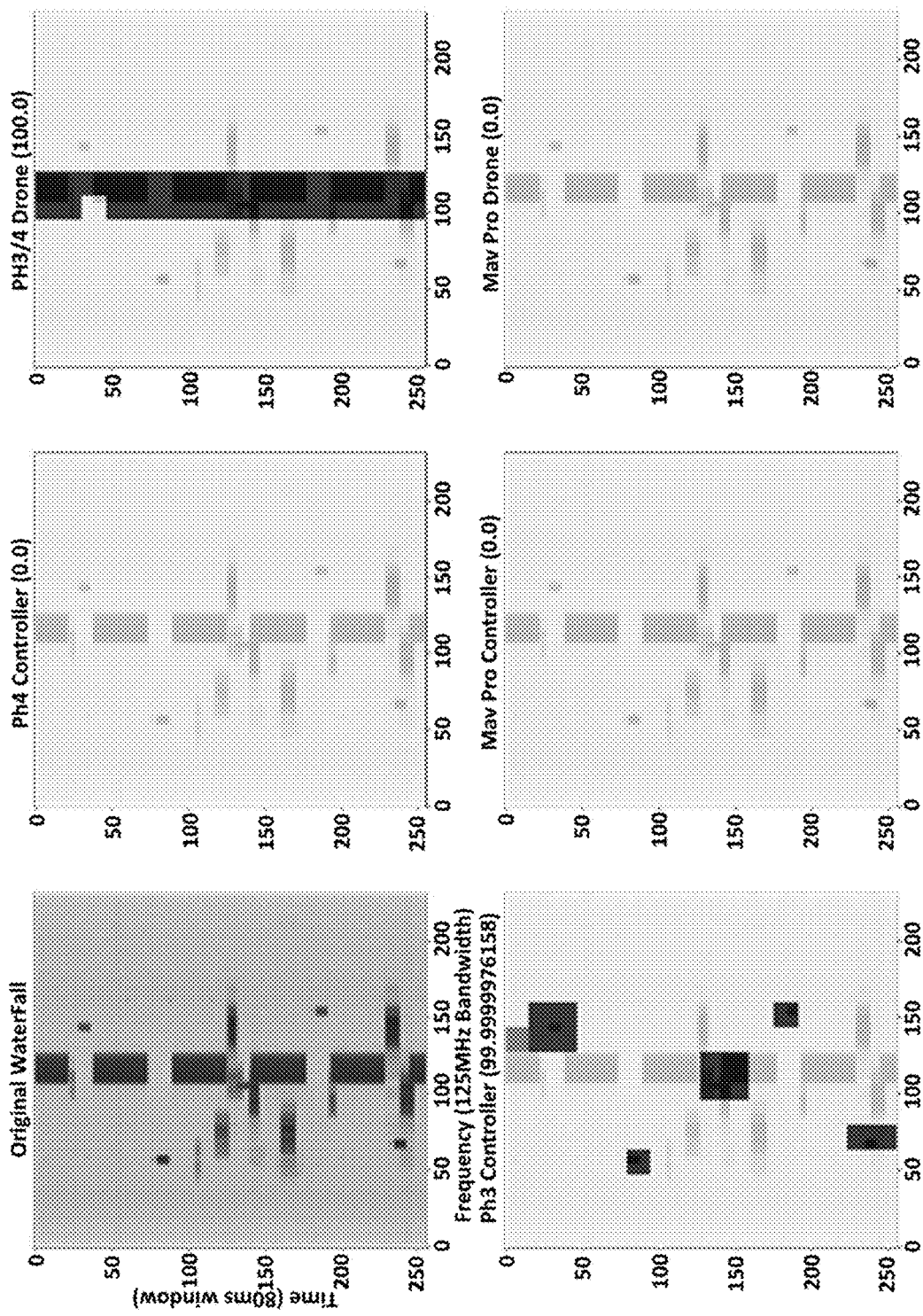
FIG. 14 illustrates a scenario for an RF environment with a Phantom 3 controller and drone.
Figure 15:
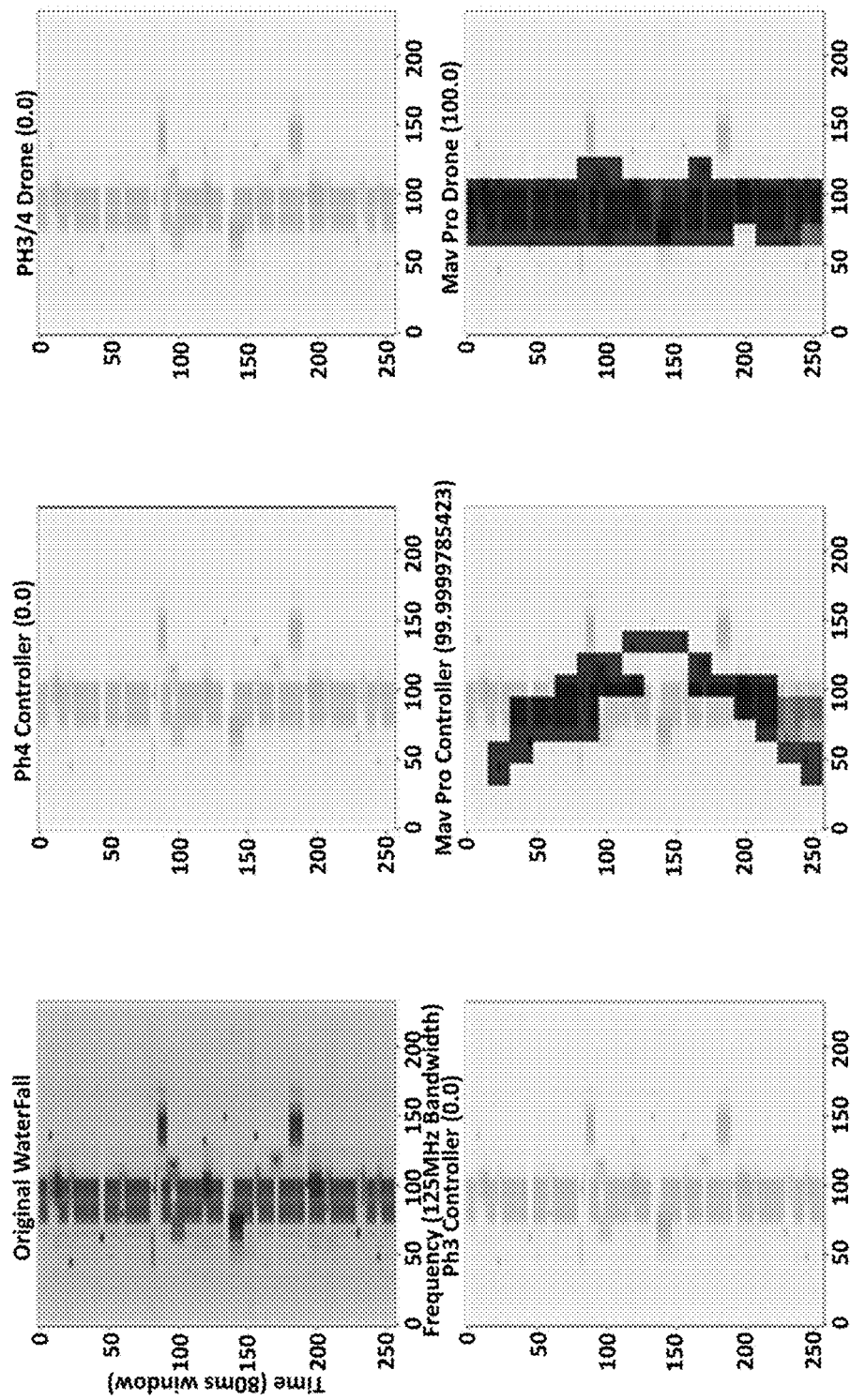
FIG. 15 illustrates a scenario for an RF environment with a Mavic Pro controller and drone in wideband mode.
Figure 16:
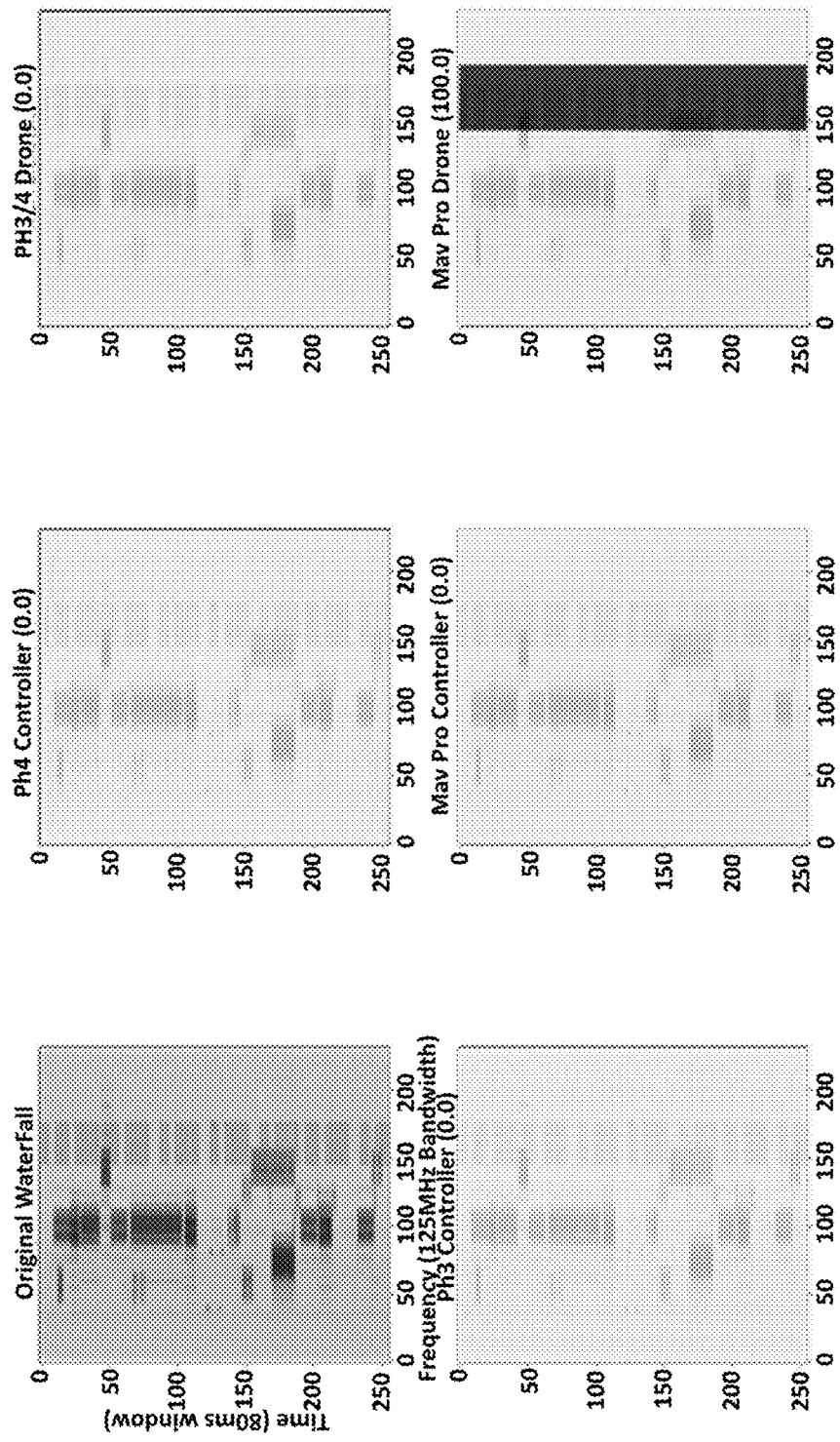
FIG. 16 illustrates a scenario for an RF environment with a Mavic Pro drone in wideband mode.
Figure 17:
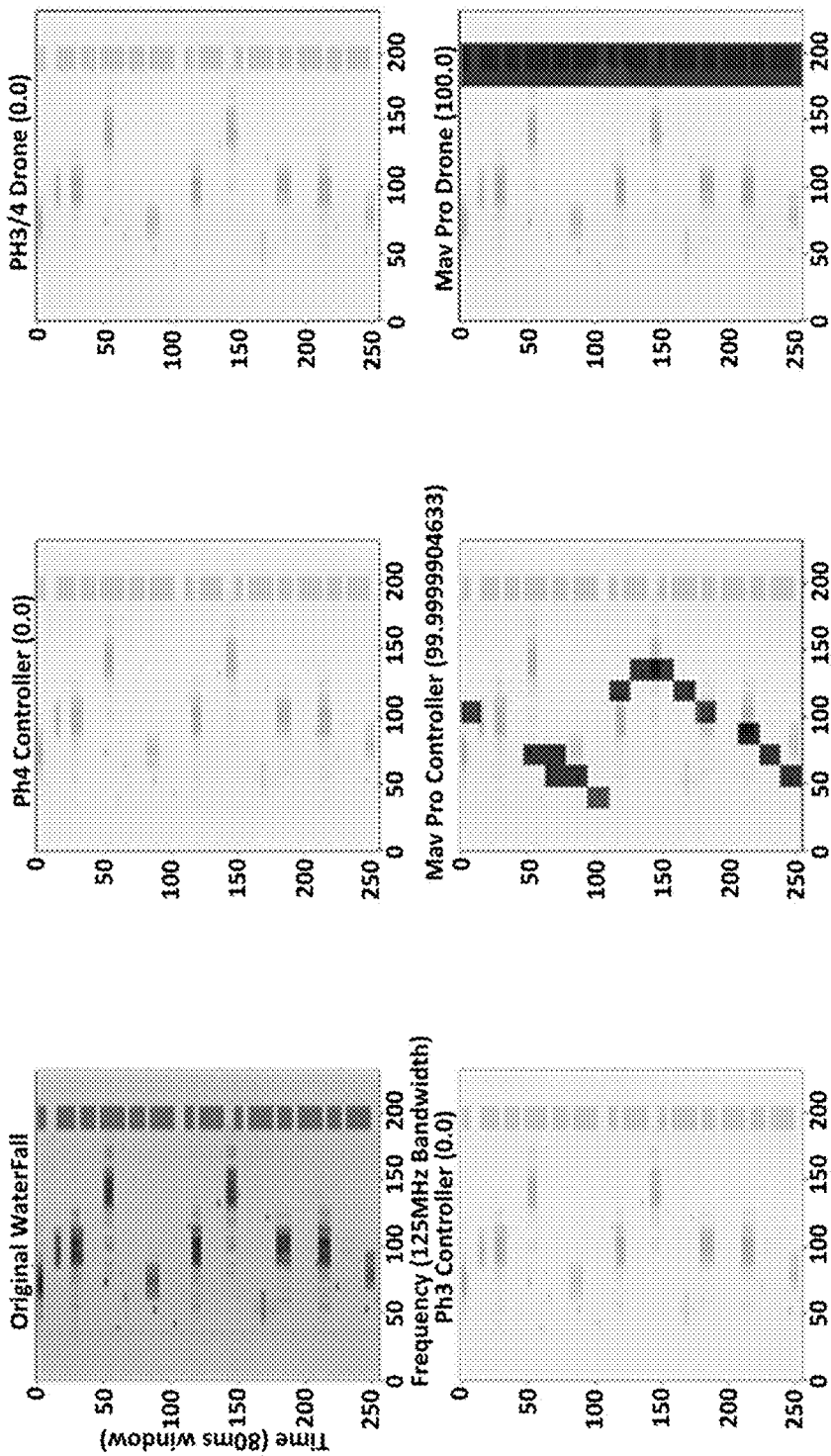
FIG. 17 illustrates a scenario for an RF environment with a Mavic Pro controller and drone.
Figure 18:
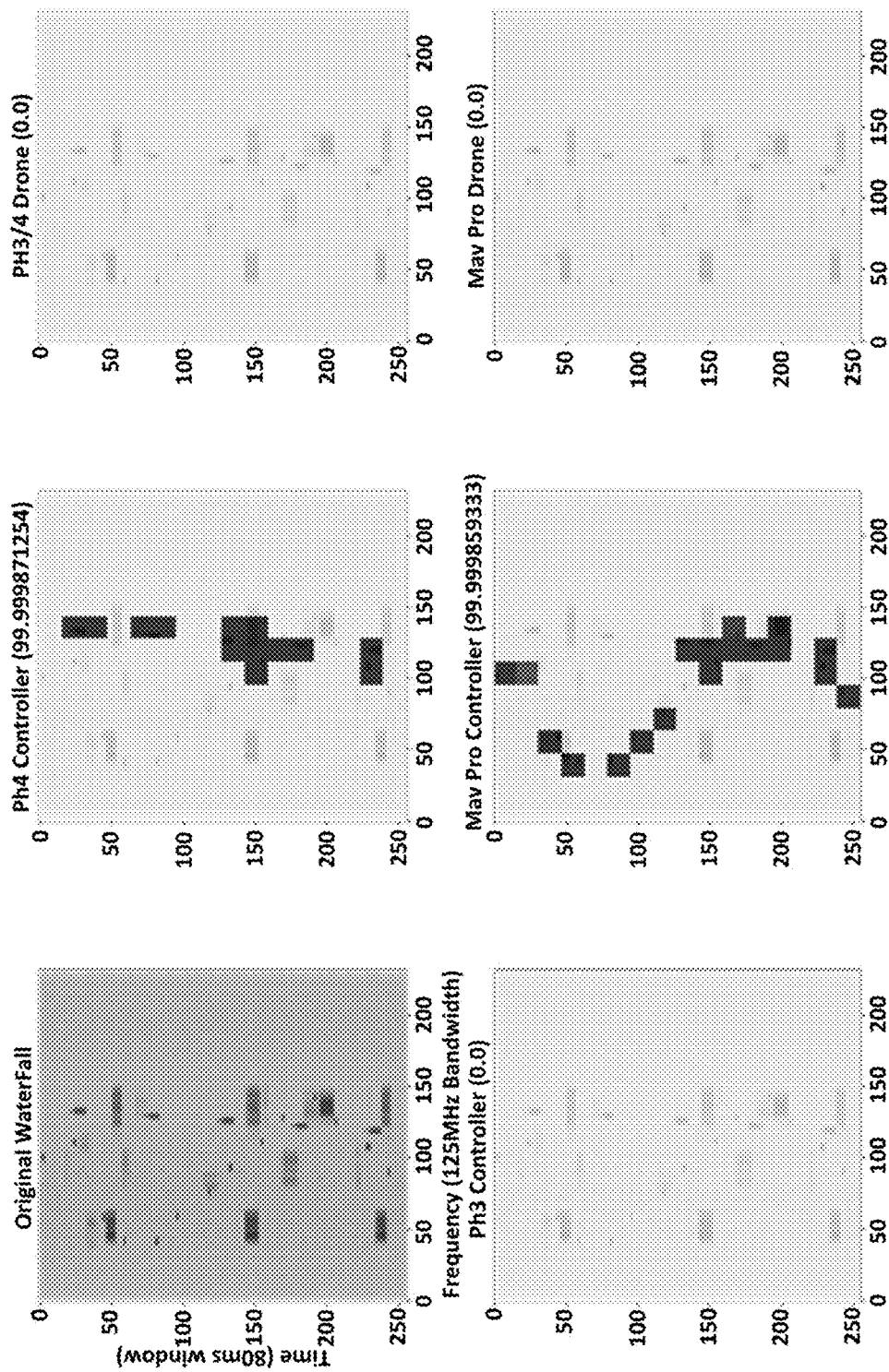
FIG. 18 illustrates a scenario for an RF environment with a Mavic Pro controller and a Phantom 4 controller.

The Artificial Intelligence (AI) algorithm is used to enhance performance for RF data analytics. The RF data analytics process based on the AI algorithm is visualized. The RF waterfalls of several drone scenarios are presented in FIGS. 8-18. FIG. 8 illustrates a scenario for an RF environment with just noise. FIG. 9 illustrates a scenario for an RF environment with a Phantom 4 controller and drone. FIG. 10 illustrates a scenario for an RF environment with two Mavic Pro drones. FIG. 11 illustrates a scenario for an RF environment with a Mavic Pro controller only. FIG. 12 illustrates a scenario for an RF environment with one Mavic Pro drone only. FIG. 13 illustrates a scenario for an RF environment with one Phantom 3 controller only. FIG. 14 illustrates a scenario for an RF environment with a Phantom 3 controller and drone. FIG. 15 illustrates a scenario for an RF environment with a Mavic Pro controller and drone in wideband mode. FIG. 16 illustrates a scenario for an RF environment with a Mavic Pro drone in wideband mode. FIG. 17 illustrates a scenario for an RF environment with a Mavic Pro controller and drone. FIG. 18 illustrates a scenario for an RF environment with a Mavic Pro controller and a Phantom 4 controller.

Each scenario is illustrated with 6 waterfall images. Each waterfall represents ~80 ms of time and 125 MHz of bandwidth. The top left image is the waterfall before an AI processing. The other five images are waterfalls after the AI processing. For each signal type, the areas of the waterfall that are likely for the RF signal type are highlighted. Areas that are not for the signal type are grayed out. The overall probability that a signal exists in the image is printed in the title of each waterfall image. In one embodiment, the AI algorithm is securely integrated with a state engine and a detection process of the present invention.

In one embodiment, a method for drone detection and classification comprises applying FFT function to RF data, converting FFT data into logarithmic scale in magnitude, averaging converted FFT into 256 by 256 array representing 125 MHz of bandwidth and 80 ms of time as a base tile, applying normalization function to the base tile, applying a series of convolutional and pooling layers, applying modified You Only Look Once (YOLO) algorithm for detection, grouping bounding boxes displayed in the waterfall images (e.g., waterfall plots in FIGS. 8-18), classifying signals based on the shape of detection output, verifying results with a second level recurrent neural network (RNN) based pattern estimator.

In one embodiment, a method for training comprises recording clean RF signals, shifting RF signals in frequency randomly, creating truth data for YOLO output, adding a simulated channel to the RF signals, recording typical RF backgrounds, applying FFT function to RF data, converting FFT data into logarithmic scale in magnitude, averaging converted FFT into 256 by 256 array representing 125 MHz of bandwidth and 80 ms of time as a base tile, applying normalization function to the base tile, applying a series of convolutional and pooling layers, applying modified You Only Look Once (YOLO) algorithm for detection, grouping bounding boxes displayed in the waterfall images (e.g., waterfall plots in FIGS. 8-18), applying a sigmoid cross entropy function, and applying an Adaptive Moment Estimation (Adam) based back propagation algorithm.

In one embodiment, a drone detection engine is operable to convert FFT flows from a radio to a tile. For each channel, the drone detection engine is operable to standardize the FFT output from the radio at a defined resolution bandwidth, and group high resolution FFT data into distinct bins overtime. The drone detection engine is further operable to calculate average and standard deviation of power for discrete FFT bins, assign a power value to each channel within the tile. Each scan or single stare at the radio is a time slice, and multiple time slices with power and channel assignment create a tile. Tiles from different frequency spans and center frequencies are identified as a tile group by a tile group number. Receivers in the drone detection system are operable to be re-tuned to different frequencies and spans. In one embodiment, the drone detection system comprises multiple receivers to generate tiles and tile groups.

Figure 19:
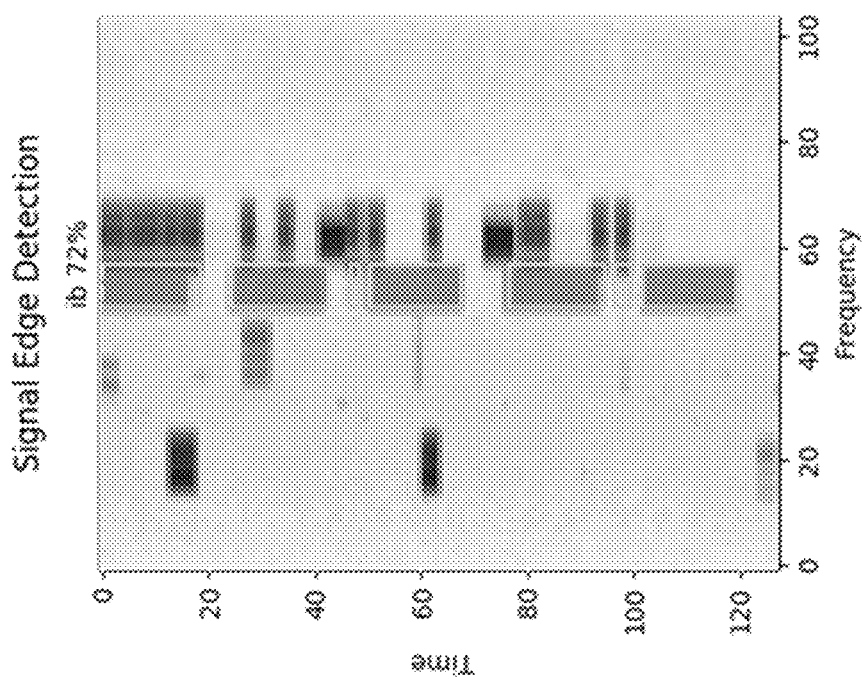
FIG. 19 is an illustration of identifying drones and controllers based on signal edge detection.

In one embodiment, a tile is sent to a YOLO AI Engine. Outputs of a decision tree in the YOLO AI engine are used to detect multiple drones and their controllers. Drones of the same type of radio protocol can be identified within the tile. Controllers of the same type of radio protocol can be identified within the tile. Drones of different radio protocols can also be identified within the tile. Controllers of different radio protocols can also be identified within the tile. FIG. 19 is an illustration of identifying drones and controllers based on signal edge detection.

In one embodiment, a plurality of tiles is sent to the YOLO AI engine. In one embodiment, a tile group is sent to the YOLO AI engine. The YOLO AI engine generates an output for each tile to identify drones and their controllers with a probability. An average probability is calculated based on outputs for multiple tiles in the tile group. For each tile group, the YOLO AI engine computes outputs for several tiles per second.

In one embodiment, a state engine controls the flows of tiles and tile groups into one or more AI engines. AI engines do not use frequency values for analytics. Thus, the one or more AI engines are operable for any frequency and frequency span that a drone radio supports. The state engine further correlates output of the one or more AI engines to appropriate tiles and tile groups.

The systems and methods of the present invention are operable for direction finding of drones and their controllers. Outputs from the AI engine are denoted with time basis for the drones and their controllers.

Drones typically maintain the same frequency unless their firmware detects interference. Then the drones may negotiate a change with their controllers. This does not create an issue for detection as long as the new frequency and span is monitored by the systems and methods of the present invention. Drone controllers typically use a frequency hopping spread spectrum (FHSS) or other Frequency hopping system (e.g., Gaussian frequency shift keying (GFSK)).

Figure 20:
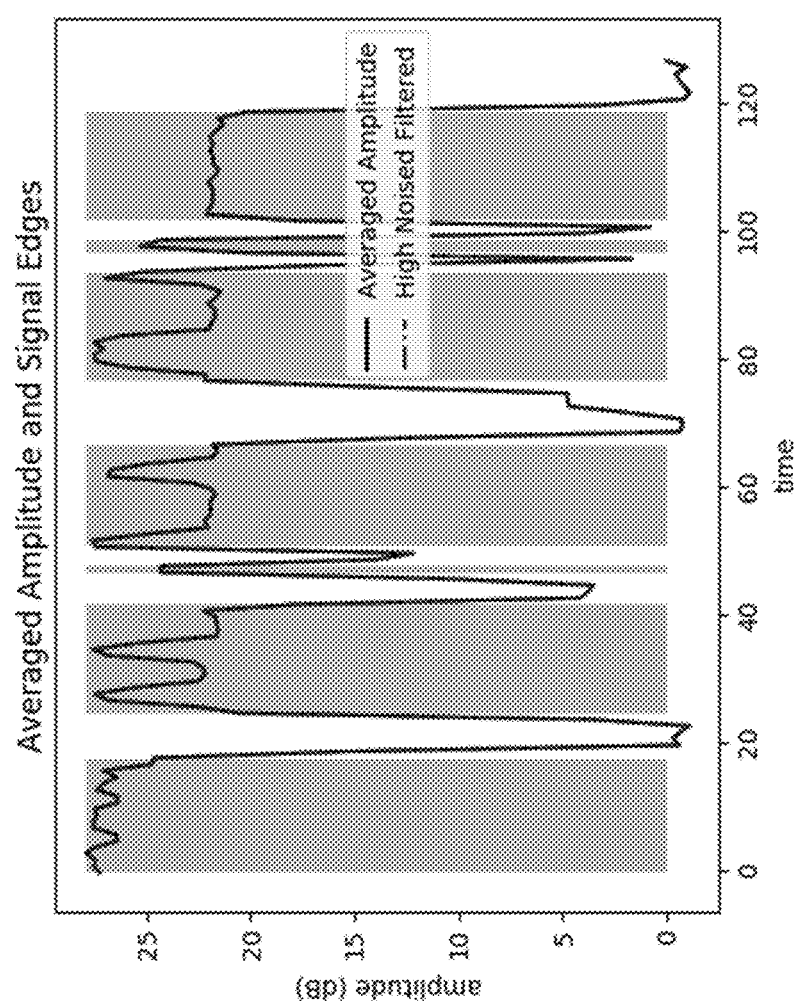
FIG. 20 is an illustration with averaged signal amplitudes and signal edges according to one embodiment of the present invention.

In one embodiment, the systems and method of the present invention are operable to approximate a start time of a line of bearing for a direction finding (DF) system. The time intervals are either known or estimated based upon the behavior monitored by the AI engine and state engine. This allows the time slice and frequency of each individual drone and/or controller to be passed to the DF system. In one embodiment, three or four receivers are coordinated to collect information in appropriate frequency segments, wherein the frequency segments are similar to tiles described earlier. FIG. 20 is an illustration with averaged signal amplitudes and signal edges according to one embodiment of the present invention.

The AI engine examines the segments to determine if a drone or controller exists. An azimuth of the drone or controller in an Earth-Centered Earth-Fixed coordinate system is determined based on other information collected from the three or four receivers using time difference of arrival (TDOA), angle of arrival (AOA), power correlative, or interferometry techniques.

Figure 21:
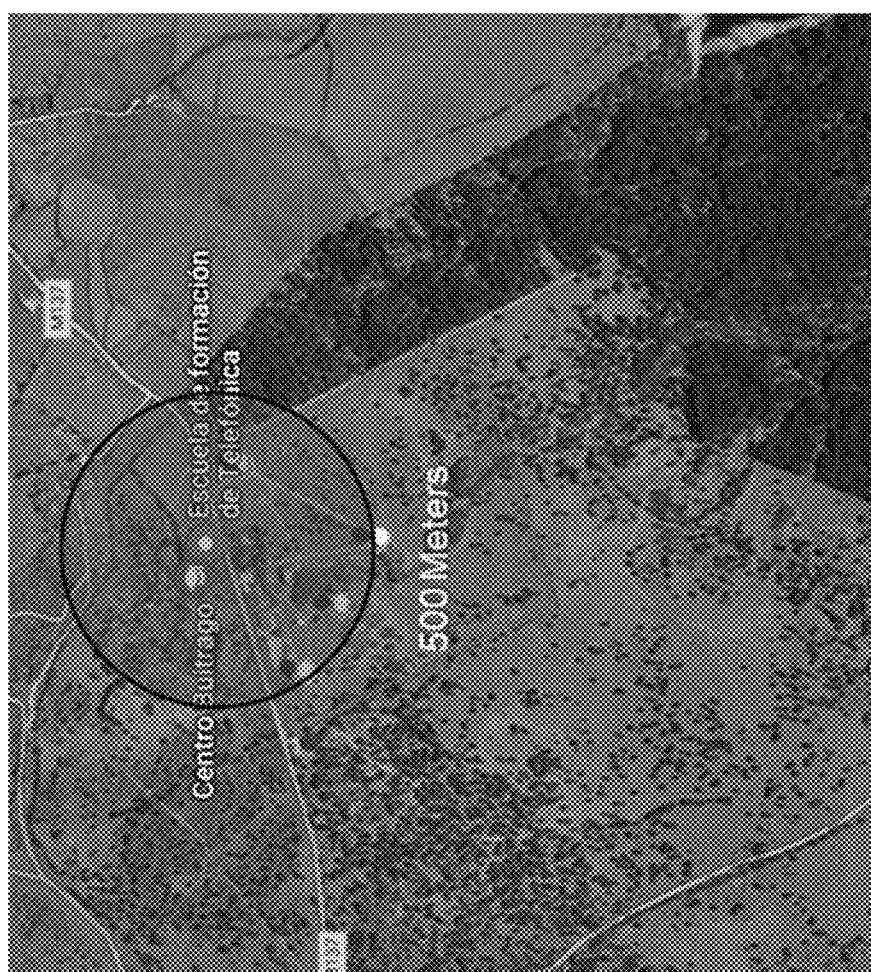
FIG. 21 displays a detection range of less than 500 meters based on equipment specification and location.

Distance capability of UAV detection and classification system depends on hardware configuration, environment morphology and restrictions based on country and classification of the counter UAV operator. In one embodiment, the systems and methods for unmanned vehicle recognition are operable to detect unmanned vehicles within 3-4 kilometers. FIG. 21 displays a detection range of less than 500 meters based on equipment specification and location.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for unmanned vehicle (UV) recognition in a radio frequency (RF) environment, comprising:
    at least one node device in network communication with a multiplicity of RF receivers and a displaying device;
    wherein the multiplicity of RF receivers is operable to capture RF data in the RF environment, convert the RF data to fast Fourier transform (FFT) data, and transmit the FFT data to the at least one node device;
    wherein the at least one node device comprises a signal processing engine, a detection engine, and a direction-finding engine, and wherein the at least one node device is configured with an artificial intelligence (AI) algorithm;
    wherein the signal processing engine is operable to average the FFT data into at least one tile;
    wherein the detection engine is operable to detect at least one signal related to at least one UV in the at least one tile based on the AI algorithm;
    wherein the direction-finding engine is operable to calculate a line of bearing for the at least one UV; and wherein the displaying device is operable to display the line of bearing of the at least one UV.

2. The system of claim 1, wherein the AI algorithm comprises an inception-based convolutional neural network operable to generate probabilities that UVs are detected.

3. The system of claim 1, wherein the AI algorithm comprises a You Only Look Once (YOLO) algorithm operable to receive the at least one tile, generate an output for each of the at least one tile to identify the at least one UV with a probability, and calculate an average probability based on the output for each of the at least one tile.

4. The system of claim 1, wherein each of the at least one tile is a 256 by 256 array representing 125 MHz of bandwidth and 80 ms of time.

5. The system of claim 1, wherein each of the at least one tile is visually represented in a waterfall image via a graphical user interface on the displaying device.

6. The system of claim 1, wherein the at least one node device further comprises a classification engine operable to classify the at least one UV by comparing the at least one signal to classification data in real time or near real time.

7. The system of claim 1, wherein the displaying device is operable to display an angle and a frequency of the at least one signal.

8. The system of claim 1, wherein the RF data is from a spectrum between 20 MHz and 6 GHz.

9. The system of claim 1, wherein the detection engine is operable to detect the at least one UV by radio communication protocols.

10. The system of claim 1, wherein the at least one node device further comprises a learning engine operable to update a classification library with emerging protocols.

11. The system of claim 1, wherein the at least one UV is aerial, terrestrial, or water borne.

12. The system of claim 1, where the at least one node device is operable to transmit an alert related to the at least one UV to a counter UV system via email, short message service (SMS), or a third-party integration.

13. The system of claim 12, wherein the counter UV system is operable to intercept communications between the at least one UV and a corresponding at least one UV controller.

14. The system of claim 1, wherein the at least one node device is operable to train the AI algorithm for UV recognition by capturing and recording the RF data from a multiplicity of UVs over different channels and different RF bandwidths.

15. A system for unmanned vehicle (UV) recognition in a radio frequency (RF) environment, comprising:
a multiplicity of node devices in network communication with a multiplicity of RF receivers;
wherein the multiplicity of RF receivers is operable to capture the RF data in the RF environment, convert the RF data to fast Fourier transform (FFT) data, and transmit the FFT data to the multiplicity of node devices;
wherein the multiplicity of node devices each comprises a signal processing engine, a detection engine, a classification engine, and at least one artificial intelligence (AI) engine;
wherein the signal processing engine is operable to average the FFT data into at least one tile;
wherein the detection engine is operable to group the FFT data into discrete FFT bins over time, calculate average and standard deviation of power for the discrete FFT bins, and identify at least one signal related to at least one UV;
wherein the at least one AI engine is operable to generate an output for each of the at least one tile to identify at least one UV with a probability; and
wherein the classification engine is operable to classify the at least one UV by comparing the at least one signal to classification data.

16. The system of claim 15, wherein each of the multiplicity of node devices further comprises a state engine operable to control a flow of the at least one tile into the at least one AI engine.

17. The system of claim 15, wherein the multiplicity of node devices is operable to estimate a geographical location for the at least one UV.

18. A method for unmanned vehicle (UV) recognition in a radio frequency (RF) environment, comprising:
providing a system comprising a multiplicity of RF receivers and a displaying device in network communication with at least one node device, wherein the at least one node device each comprises a signal processing engine, a detection engine, a direction-finding engine, and at least one artificial intelligence (AI) engine;
the multiplicity of RF receivers capturing RF data in the RF environment, converting the RF data to fast Fourier transform (FFT) data, and transmitting the FFT data to the at least one node device;
the signal processing engine averaging the FFT data into at least one tile;
the detection engine identifying at least one signal related to at least one UV in the at least one tile based on an AI algorithm;
the direction-finding engine calculating a line of bearing for the at least one UV; and
the displaying device displaying the line of bearing of the at least one UV.

19. The method of claim 18, further comprising the at least one node device training the at least one AI engine for UV recognition by capturing and recording signals from a multiplicity of UVs over different channels and different RF bandwidths.

20. The method of claim 18, further comprising tuning the multiplicity of receivers to a different frequency span.

* * * * *